(12) United States Patent
Dermitzakis et al.

(10) Patent No.: US 10,433,501 B2
(45) Date of Patent: Oct. 8, 2019

(54) HYBRID EMITTER AND METHOD OF INTEGRATING EMITTERS AND ACCESSORIES WITHIN IRRIGATION PIPE

(71) Applicants: Emmanuil Dermitzakis, Attikis (GR); Aristeidis Dermitzakis, Attikis (GR)

(72) Inventors: Emmanuil Dermitzakis, Attikis (GR); Aristeidis Dermitzakis, Attikis (GR)

( * ) Notice: Subject to any disclaimer, the term of this patent is extended or adjusted under 35 U.S.C. 154(b) by 0 days.

(21) Appl. No.: 15/487,350

(22) Filed: Apr. 13, 2017

(65) Prior Publication Data
US 2017/0265402 A1    Sep. 21, 2017

Related U.S. Application Data

(63) Continuation of application No. PCT/GR2015/000050, filed on Oct. 13, 2015.

(30) Foreign Application Priority Data

Oct. 13, 2014 (GR) .............................. 20140100517

(51) Int. Cl.
*A01G 25/02* (2006.01)
(52) U.S. Cl.
CPC ......... *A01G 25/026* (2013.01); *A01G 25/023* (2013.01)
(58) Field of Classification Search
CPC .............................. A01G 25/026; A01G 25/023

USPC .......................................................... 156/203
See application file for complete search history.

(56) References Cited

U.S. PATENT DOCUMENTS

| 2,818,965 A | * | 1/1958 | Horth | B65G 21/14 198/317 |
| 2013/0181066 A1 | * | 7/2013 | Dermitzakis | A01G 25/023 239/266 |

FOREIGN PATENT DOCUMENTS

WO   WO-2013-030606   *   3/2013

* cited by examiner

*Primary Examiner* — Christopher T Schatz
*Assistant Examiner* — Cynthia L Schaller
(74) *Attorney, Agent, or Firm* — Michael D. Eisenberg

(57) ABSTRACT

A hybrid emitter of low discharge for water or solutions is inserted and welded into a pipe during the production phase. The hybrid emitter bears at its convex and cylindrical surface local protrusions that are covered completely from the pipe which is swelled locally. The water exits preferably from two nozzles that are created within the protrusions by the cutting-off of the tips, which protrusions protrude and after cutting-off, said nozzles eject the water almost crosswise to two opposite directions and at short discrete distances left and right of the pipe. A method for welding of emitters and accessories into a pipe where the emitter or the hybrid one with or without protrusions on the outer surface, are inserted into the pipe during its production phase.

10 Claims, 13 Drawing Sheets

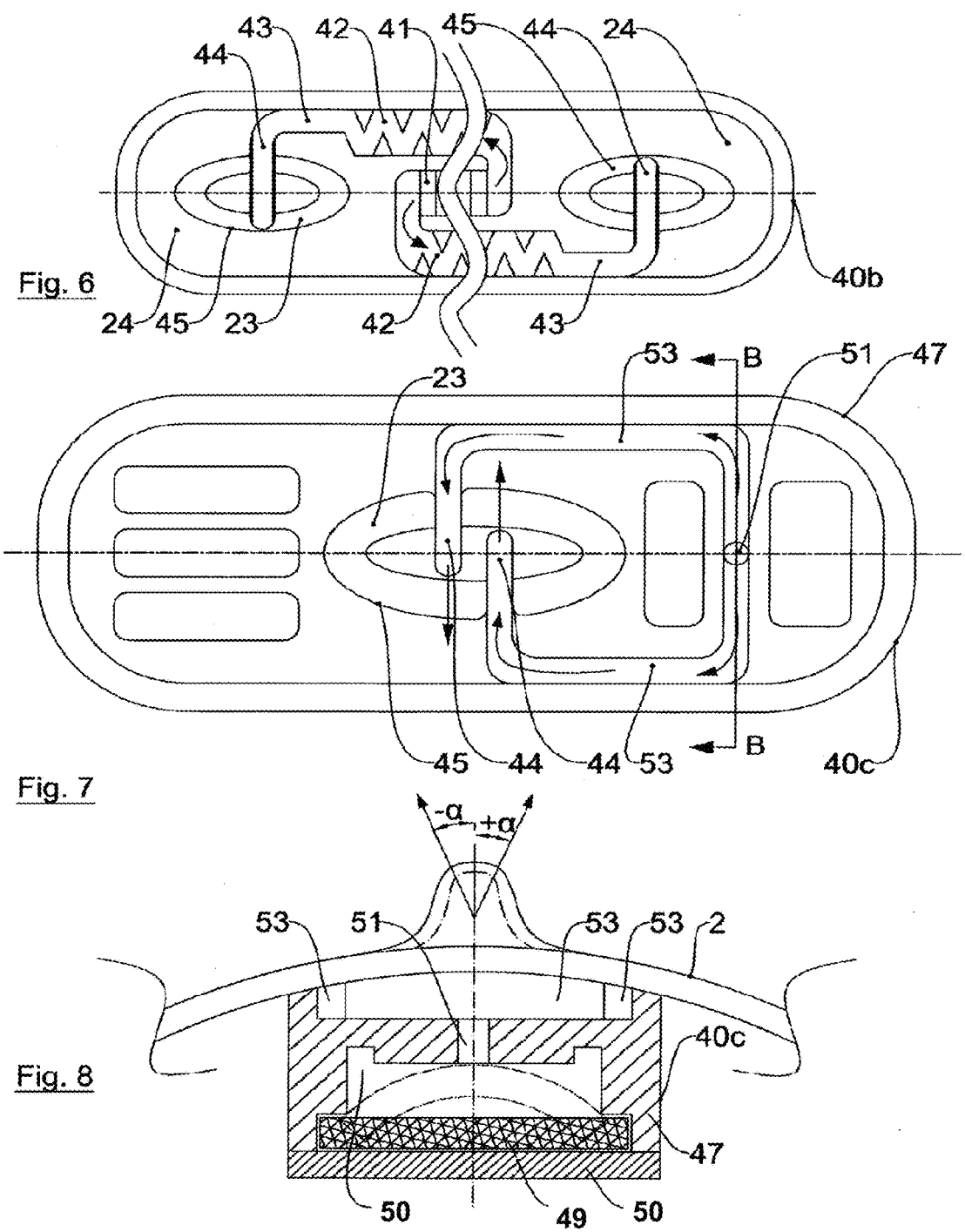

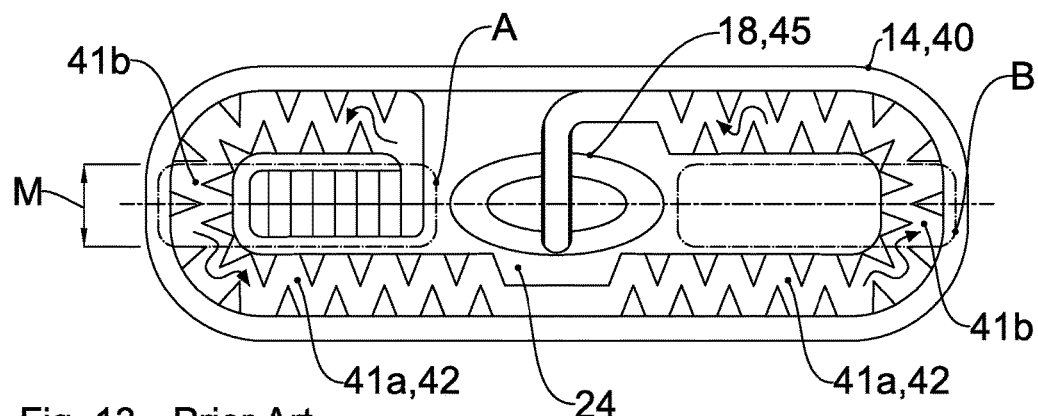
Fig. 13 --Prior Art--
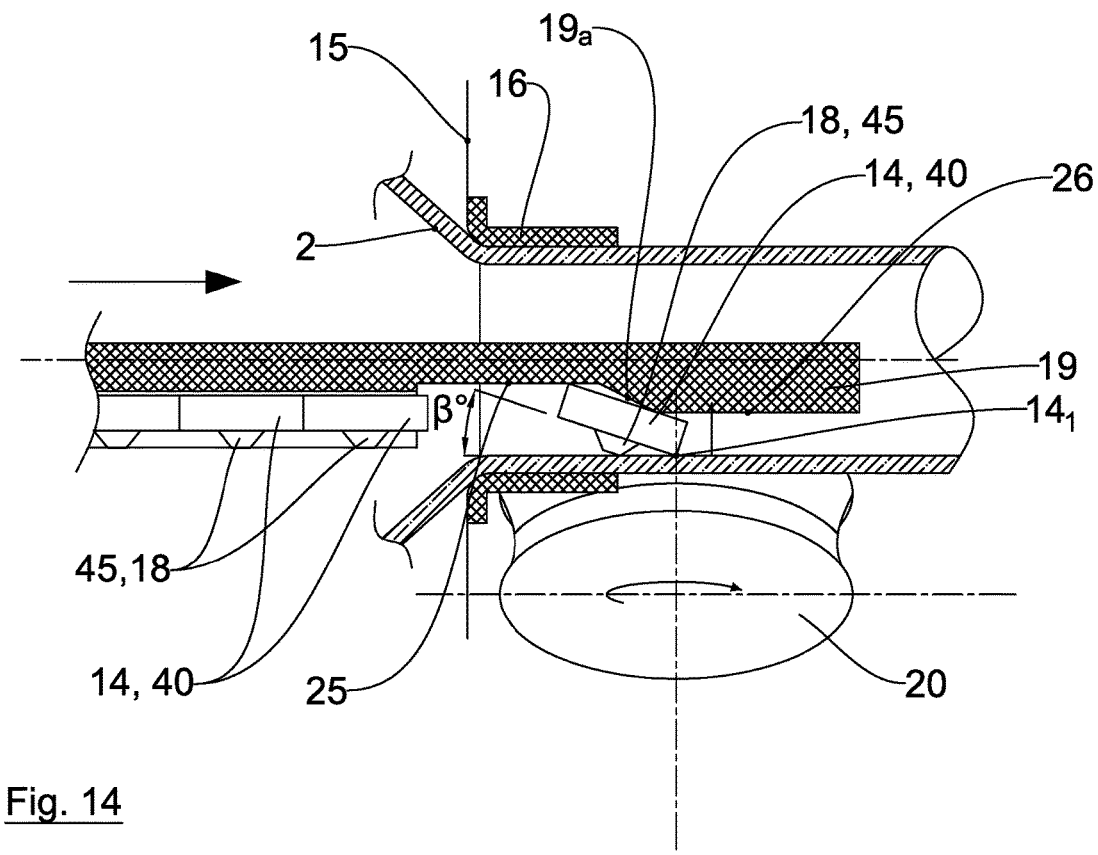
Fig. 14

HYBRID EMITTER AND METHOD OF INTEGRATING EMITTERS AND ACCESSORIES WITHIN IRRIGATION PIPE

CROSS-REFERENCES TO RELATED APPLICATIONS

This application is a bypass continuation of International Application Serial Number claims priority from U.S. Provisional Application Serial Number PCT/GR2015/000050 filed Oct. 13, 2015, which claims priority from Greek Application Serial number filed Oct. 13, 2014, which is hereby incorporated herein by reference in their respective entirety.

The present invention refers to emitter combining the function of low discharge emitters and mini-sprinklers, and method of insertion and integration of emitters and accessories with local elevations within the irrigation pipe during its production phase along with the method of cutting off part of the protrusions in order to create water outlet openings.

STATE OF THE ART

Local irrigation is the most important part of irrigation sector with typical methods as follows: a) drip irrigation, mainly with dripline pipes and incorporated emitters within the pipe, and b) local micro-sprinklers. With the same system the ore is being extracted from the mines, where the soil is soaked-wetted with appropriate chemical solutions and the ore is separated.

In drip irrigation and the dripline pipes, the water is exiting, by definition with very low velocity from the outlet opening of the pipe and ends up on the soil creating a small, almost circular wetted area of 20-30 cm in diameter. At micro-sprinklers, of certainly substantially larger discharge in comparison, the water in sprayed high above ground and with greater velocity, from high positioned micro-sprinkler, spraying an area of several square meters, with multiple radial and parabolic fine water trajectories.

Both systems pose certain advantages and disadvantages based on the operating method of choice. The advantages of drip irrigation: a) no water losses since the distribution of water is performed with very low discharge rates and with pin point accuracy to the soil, b) minimal water evaporation (almost zero) due to the targeted and absolute minimal wetted area of soil, c) minimal, if at all, affect the emitted water from the wind conditions, d) 3D motion of water in the soil (upwards, downwards, sideways), allowing the formation of the important air bubbles within the soil.

On the contrary at micro-sprinklers, the water is ejected at huge discharge rates, and at relatively large radius (2-3 m) in multiple and huge number of very fine trajectories very close next to each other, thus having considerable water losses (wind, evaporation, etc.) and a one-dimensional vertical motion of water into the soil not allowing any "empty" spaces for the air.

Another advantage of the drip irrigation regards, a) the greater "Maximum Recommended Lateral Length" (MRLL) and b) the smaller diameter of the dripline pipe, both of which are due to the considerable lower water discharge rates. The MRLL refers to the maximum lateral length that a dripline pipe may be effectively applied, in order for the difference of the discharge rates between the first and last water emitter is within the acceptable limits of the operation.

On the contrary at micro-sprinklers, since the water is ejected at huge discharge rates, the maximum recommended lateral length is much shorter.

The above mentioned irrigation methods behave differently when they are applied to inclined terrains. The dripline pipe methods lack in comparison to corresponding micro-sprinkler systems since in dripline irrigation the water is emitted with almost zero velocity from the outlet opening of the pipe and it cannot "leave"/separate away from the outer surface of the pipe. Thus, the water drops collect all together and follow due to gravity the pipe's inclination until the lowest point of its bent or until a contact point between the pipe and the soil's surface. Only then the drops separate from the surface of the pipe in the form of a continuous stream, resulting to poor water distribution uniformity and canceling all the aforementioned advantages.

In case of the micro-sprinklers the water distribution is not affected from the terrains inclination, since the water is being ejected almost radially from the distributor at the top of a relatively high pole fixed on the ground fed through a micro-tube. On the other hand all the disadvantages of the category remain as discussed.

Analogous issues are noticed during the ore leaching and extraction from mines where the terrain is soaked-wetted with chemical solutions. If the terrain is not horizontal, drip irrigation is at a disadvantageous point of view.

In reality drip irrigation has always disadvantages by this particular application, even when the terrain is horizontal since: the chemical solutions reacts with the minerals and the liquid product of the reaction that contains the bounded ore-metal, is being drained and directed to the extraction site while the non-wetted and diluted parts remain in the initial mineral and large cavities on the horizontal terrain surface will be gradually formed. As such at relatively small time frame the irrigation pipe losses the continual support on the horizontal terrain and it only relays on the support of faraway edges of the terrain cavities that expand continuously. Thus is almost impossible for the pipe to remain horizontal but it bends forming a wave-like shape with repeated high and low points. Obviously the high points are the edges of the ground cavities and the low points are the lowest points of the pipe bent inside the cavity. The solution, in droplet form, leaks around the pipe and is only separated from it at the lowest points of the pipe's bent, due to gravity, lacking any irrigation uniformity performance. Since the terrain cavities as already discussed are expected to expand continuously they tend to be joined with each other, and thus drastically minimize the number of low points (water separation points) of the set up, and the wetting uniformity to degrade to the worst.

The same issue remains for drip irrigation-wetting even in subsurface and completely horizontal installations. After a certain period of time the same exactly conditions will form (as discussed earlier) but the cavities shall be formed underground and the pipes will left supported at the edges of those cavities.

Drip irrigation, the most advantageous system available today is lacking at those important applications, the ore leaching.

In order to implement drip irrigation also at these applications the following preparations have to be applied:

Immediately after the irrigation pipe is produced add-on open rings (collars) are placed over each pipe's water outlet openings, thus providing a peripheral outer obstacle/barrier protruding significant and disturbing the pipe's smooth surface stopping the leakage of the water assisting it to separate from. When a sufficient amount of water is collected before these artificial barriers (downhill), it forms drops due to surface tension forces, which are continuously detached due to gravity.

This solution, apart from the obvious cost disadvantages, has several others in addition, such as: the ring has to embrace the pipe and follow its curvature completely and tightly, a fact that requires the pipe to be in a perfect round outer shape and of considerable wall thickness in order not to cave-in (collapse) or allow gaps in its periphery. These prerequisites are met only from the cylindrical emitters and their corresponding dripline pipes that are unfortunately of inferior and obsolete technology with bulky emitters and pipes of considerable thickness. Such as e.g. U.S. Pat. Nos. 5,111,995, 3,856,333, 5,330,107, 4,366,926.

The most important category of dripline irrigation, the linear emitter dripline, is excluded from being a solution (i.e. WO 96/24243, U.S. Pat. No. 4,307,841, EP 1 541 014 A1, WO 2012/038766, US 2007/0194149 A1), since it is both impossible for these types to maintain a perfectly cylindrical form throughout and due to the advanced technology it is neither required to do so nor to have considerable thickness on their pipes.

Especially for the technologies WO 2012/038766 A2, US 2009/0261183 A1, despite the fact that there are initially protrusions of considerable height over the cylindrical surface of the emitter, and multiple outlets of water: a) in order for the water outlet openings to be formed, the protrusions have to be cut exactly at the level of the outer surface of the pipe and finally not to protrude beyond it, b) the meandering paths as well as the emitter's pathways in its entirety are throttling by definition (due to drip irrigation) the total available pressure of the water supply network and c) the water outlets from the outlet openings located exactly on the surface of the pipe with almost zero velocity, without eventually succeeding in removing immediately and separately each one of the droplets from the pipe at inclined terrains.

It exists a technology WO 92/05689 referring only to pressure compensated emitters of a linear but irregular, heavily convex, not of cylindrical form that are affixed in the inner surface of the pipe completely swelling and swelling it locally. The inner miniature-pipe covered by the pipe's surface shall be cut at later stage from a rotating cutting device forming a water outlet over the surface of the pipe. Obviously its behavior is no different in comparison to the rest of the dripline pipes available, since it is also by definition a drip system. Another weak spot is the fact that the pipe expands locally and intensively and the thickness of the pipe's walls weakens peripherally at the whole of its cross-section.

The most important disadvantage of drip irrigation even in its traditional application, is the high density and the big number of dripline pipe laterals that are required to be installed in order to cover a certain irrigation area. It is obvious that the points of water drops and water supply are located immediately underneath the emitters and the emitters themselves are only located along the length of the dripline lateral. This fact alone renders the installation of dripline pipes non-profitable when there is a need for a dense array of laterals and -multiple wetted points on the soil. Such cases regard e.g. the cultivations of dense planting or at hydrometallurgy installations (leaching) where the maximum possible wetted volume is required.

At the technology of WO 03/045131 A2 the linear emitter bears two independent water outlets, where both of the droplets due to their minimal distance separating them (approximately 2-3 cm) and the almost zero water outlet velocity, they are joined together forming a single and common wetted place (of a diameter approx. 35-40 cm) on the soil and they cannot separate themselves from the pipe's outer surface.

In order to cause a water spray with substantial range which certainly removes the water from the pipe's surface requires the following prerequisites: a) considerable available pressure at the outlet to achieve a significant final water outlet velocity, and b) a discrete and significant length of a nozzle that protrudes over the surface of the pipe.

Conditions not present/available at the driplines of the state of the art since: a) at EP 1 541 014 A1 & US 2007/0194149 A1 the existence of a spacious pool at the outlet of the meandering path as well as the considerably larger and uncontrolled cross-section of the outlet opening causes a pressure drop and drastically reduce the water outlet velocity, while b) at WO 2012/038766 the outlet channel exhibits a cross-section almost equal to the meandering path in order for the water to maintain a certain velocity thus avoiding the generation of sediments alone. At the outlet though, the latter technology does not bear a spacious pool similar to the other previously mentioned technologies, the outlet channel inevitably heavily deviates as such for the cross-section to sufficiently expand locally and the outlet velocity to reduce substantially (diffuser effect) in order to the drip irrigation's, main attributes (by definition) be preserved. It is a common characteristic of drip irrigation that the water outlet cross-section must be kept larger than the respective meander path cross-section, in order to control and significantly reduce the outlet water velocity and ensure the outlet of water in the form of a drop, if for any reason the water supply pressure increases.

Most importantly, on all the related technologies the meandering path is calculated by definition as such in order to eliminate the entirety of the available pressure of the water supply network and in conjunction to the larger outlet cross-section the water outlet velocity to remain always almost zero.

It should be noted that in case the water outlet velocity increased at an emitter of the state of the art (EP 1 541 014 A1, WO 2012/038766 A2, & US 2009/0261183 A1) where the nozzle 44 is not protruding beyond the surface of the pipe, the flow would follow—completely random and uncontrollable directions. The water would detach from the outlet without being supported by any nozzle and as result at the edges of the opening's periphery both the phenomenon of surface tension & the continuity law prevail by retaining and spreading the water on the surface of the pipe, while a random and unstable mixture of turbulence and laminar flow of this small (by definition) water discharge will be spread: a) to multiple uneven small and thin jets (spray phenomenon) and b) to a water portion that remains and leaks onto the pipe.

The technology of WO 2006/087726 (Plastro) regards the known mini-sprinklers of the state of the art, in-line incorporated into a pipe, with pop-up capabilities for the largest part of them (liquid distributor) in addition. The disadvantages among that which has been already described and concerns all the known micro-sprinklers, regards their outlet shape and the movable and voluminous liquid distributor at the center of them which presupposes the following requirements in addition: a) precise detection of the mini-sprinkler that has been inside the pipe b) precise and sophisticated slicing around an extended close line (cycle form) in order to create pop-up capability for the movable liquid distributor of the mini-sprinkler, c) continuous monitoring (camera & software) for the proper implementation of the process. Not to mention: 1) the weakness in the resistance of the pipe due to the slicing of the large circular area and therefore the significant decreasing of the welding area affecting the reliability of the attachment, b) the complication of the construction and operation due to external moving parts, c) the clogging issues due to accumulated soil around the large opening area, and d) the big difference of the wetted surfaces which are strongly affected from the end position of the axis of the mini-sprinkler's liquid distributor regarding the surface of the soil, since it is not possible to be always in the most favorable position, that of the vertical one.

Regarding the Method of Insertion-Welding-Incorporation.

Major facts/items of drip irrigation are: a) the dripline pipes with incorporated emitters and b) the secondary pipes/laterals. The dripline pipes bear internally incorporated (in-line) and in general linear emitters. The secondary laterals/pipes are used as water supply pipe to emitters been fixed on to the pipe (on-line type). Both a) and b) are applied to very long lengths along the planting rows (at least one pipe for every plant row) distributing the water to the roots. The reliability of the operation and their associated production cost especially for dripline pipes characterizes the irrigation and the agriculture cultivation in its entirety.

The investment cost of dripline production lines is substantial. Especially the cost of: a) the sophisticated emitter insertion device, b) the emitter's detection system, c) the outlet hole perforation arrangement that must be exactly over the outlet basin and final water's collection area, which is located at the end of the emitter's inner meandering path in order to create an outlet for the water, is/are significant (WO 03/045131 A2).

For this reason they have been developed types of modern linear and inline emitters with protrusions that are significantly raised, swelling locally the pipe. These protrusions are truncated at the phase of production along with a part of the pipe covering them, creating and revealing automatically the water outlet openings. These types are described e.g. at the technologies EP 1 541 014 A1, and WO 2012/038766 A2 where along with the new linear emitters, their methods of insertion associated with them, are mentioned.

There is also the PCT/GR2012/000040 where the compression-welding of the walls of the pipe at the side wall of the local protrusions can be done in a supplementary way from a pair of two small and thin wheels without having own independent motion, placed to the left and right, immediately after the main single wheel. These pair of wheels rotates on two vertical shafts, while the wheels are not in contact to each other the distance between their treads is equal or greater than the width of the protrusions, since they are determined to press and weld their side walls on to the pipe. This arrangement is supplementary, since: a) it does not have own motion and b) is not allowed to come in contact with any part of the convex surface of emitter around the protrusions. Since every part of the side surface of the wheels unlike to their treads has different peripheral velocity due to different radius associated with. Therefore it does not meet the basic and ideal prerequisite of the pressure means for the proper welding, which are: a) the absolute match of the pipe's production velocity (possible only by driven means), and b) the uniform compression along the entire convex surface of the emitter with the protrusions included.

There is also the technology US 2006/0186228 where the pipe is split at specific places at the production phase revealing the water outlet openings.

Apart from the linear emitters there are non-linear ones that are incorporated nonetheless in the inner surface of the pipe which swell it locally (e.g., ES 2 332 185 T3, and WO 9205689 A1, or U.S. Pat. No. 6,039,270).

Besides the emitters there are technologies relating to a base which is incorporated in the inner surface of the irrigation pipe/lateral and is utilized for fixing of on-line emitters and micro-tubes on the lateral pipe (WO 2012/12031712 A2).

Common characteristic of all the aforementioned technologies is the fact that they are primarily incorporated in the inner surface of the irrigation pipe/laterals at the production phase, and occupy part of the inner cylindrical, cross-section and also they considerably swell the pipe at the location of their welding.

The disadvantages of the insertion and integration systems EP 1 541 014 A1, and WO 2012/038766 A2 consist on the following:

At the EP 1 541 014 A1, the uniform concave tread of the elastic wheel would press unevenly the protrusions and smooth convex/bend surface of the emitter with inevitable issues on the reliable welding and sealing of the meandering paths.

The WO 2012/038766 A2, presenting an elastic wheel bearing a wide peripheral channel in the middle of its tread, cannot provide a reliable welding solution since the forces that are exerted over the contact surface (circular arc) with the pipe, by the tread even though they all have the same direction (vertical), they are not acting with the same pressure for welding on all the points of the contact surface. The vertical force's component, the radial one, compresses the pipe onto the emitter creating a substantial welding, while the other, the vertical force to the radial one, has a peripheral direction with a tendency to cause displacement (slipping) of the pipe wall from the convex surface of the emitter, thinning locally the pipe, a fact that affects the welding and the uniformity of the wall thickness, tampers the characteristics and reduces the durability of the anyway extremely thin pipe. This distortion and tampering is proportional to the size of the peripheral arc occupied by the attached emitter as well as to the size, to the height and to the arc occupied by the local protrusions. Furthermore the longitudinal zone M that contains the local protrusions of the emitter (FIG. 13) is not compressed at all, risking a problematic welding and causing failures in both welding and sealing of the water paths.

The most important fact is that the local protrusions of the emitter has to pass by exactly from the center of the peripheral channel of the wheel in order to symmetrically compress, right and left both the convex surface and the protrusions. This is practically impossible since the extruded pipe rotates and wobbles continuously around the longitudinal axis, either way left of right, and as a result the passing through of the emitter cannot be properly aligned. More specifically, the forces acting from the internal walls of the peripheral channel of the wheel on to the somehow vertical side walls of the local protrusion are almost vertical and affix the protrusions only in case that the latter are perfectly aligned with the level of symmetry of the cross-section. In case of any deviation, the vertical forces cannot be analyzed to peripheral components that would be able to dislocate the emitter-pipe assemble, moving it towards the center of the level of symmetry, aligning it (assemble) during the phase of the protrusion's passing through the zone of compression.

Regarding the device of the cutting off of the tips of the protrusions, the systems of the state of the art EP 1 541 014 A1, and WO 2012/038766 A2 are referring exclusively to dripline pipes of thin wall thickness that are allowed or are able to be completely compressed at the phase of the cutting-off of the tips.

Furthermore the simple concave cutting profile (WO 2012/038766 A2) is neither circular nor conical, and as a result the protrusions that might have been moved and turned sideways (left or right) having being deviated from the vertical axis of symmetry of the cross-section of the pipe and the fraise, not to be cut off or after cutting off of the protrusions, the cross-section of the outlet openings not to have the expected quality or being partially truncated or not having the expected shape of rims, etc. essential prerequisites for the correct function of the dripline pipes.

BRIEF DESCRIPTION OF THE INVENTION

The hybrid emitter for water or solutions, of preferably low discharge combines the function of the common known emitter and the common known micro-sprinkler that is positioned at a certain height above the ground and is connected with the lateral pipe through micro-connector and micro-tubes.

The hybrid emitter of the present invention is incorporated at the inner surface of the pipe and ejects preferably from two discrete nozzles two water jets to trajectories that move preferably in two adjacent parallel levels vertically to the longitudinal axis of the pipe. The jets are ejected symmetrically to the right and left of the vertical axis of symmetry (or the vertical radius) of the cross-section of the pipe that passes through the points of the water outlets and at a small distance right and left of the pipe. The emitter is incorporated in the inner side of the pipe at the production phase and bears all the characteristics parts of the known emitter, such as the water filter, the meandering path, where the water pressure drop takes place. Furthermore it bears a number of inclined or conical protrusions that are based and directly emerged over the convex outer surface of the hybrid emitter and are arranged in rows preferably along the longitudinal axis of the emitter.

The nozzles of considerable length are being formed between the protrusions, are of the same or smaller cross-section compared to the meandering path and are being fed with water through the narrow water exit channels that are the continuation of the meandering paths. The supply of the nozzles is preferably being done vertically towards the longitudinal axis of the pipe and the hybrid emitter. The total length and the cross-section of the meandering path are calculated and designed differently compared to the known emitters, where the total available grid pressure is "throttled-eliminated" at the meandering path, for the water to exit with no pressure and as a drop with the lowest possible velocity.

The throttling and elimination of the pressure is successfully achieved by the turbulent flow that prevails locally within the meandering path. The meandering path of the new hybrid emitter is calculated and designed, on the contrary to the corresponding drip irrigation one, as to always have available a considerable remaining pressure and thus a significant water exit velocity. This feature in combination with the suitable design of nozzle, enables the eject of water in the form of a continuous jet at a small, discrete and stable distance left and right from the outlets of the hybrid emitter creating two discrete wetted areas without leaking the surface of the pipe. This controlled jet is assisted preferably by the fact that immediately after the meandering path the flow is converted from turbulent to laminar within a narrow exit channel of significant length and by the nozzle that follows.

In order to control the range of water jet, in case that grid pressures exceed the predetermined levels, preferably a pressure control valve is installed at the beginning of the lateral pipe.

The hybrid emitter may have cylindrical form or be self-compensated or even suitable for on-line application onto the pipe.

Regarding the Insertion and Welding Method.

The emitters or hybrid emitters and accessories (incorporated mini-bases, etc.) with or without protrusions on their outer surface are positioned in a row always with the same orientation and in close contact one behind the other and are inserted in the interior of the pipe being moved with a velocity smaller than that of the extruded pipe, sliding over an inner, fixed guide, that protrudes in the interior of the fix calibrator of the vacuum bath, or its pre chamber.

Almost at the end of the fix calibrator in contact and over the extruded pipe a system of elastic wheels is arranged. The system is comprised of two independent elastic wheels with rotational axis that form preferably a 45°-90° angle between them being driven by a motor, or sets of motors, of constant peripheral velocity equal to the velocity of the extruded pipe. At the place of the set of wheels, the internal fix guide develops consecutively three levels: a horizontal, an inclined and an elevated horizontal level towards its end. The profile of the treads of the elastic wheels have preferably a slightly concave form similar to the convex surface of the emitter.

The emitter arrives at the inclined level and is initially slightly attached to the inner surface of the pipe by its preceded end, it is then dragged over by the pipe, it accelerates up to the velocity of the pipe itself, while at the same time it rotates around its own preceded end as described earlier and is dragged by the wheels over the elevated horizontal level of the guide. The protrusions are pressed against the inner surface of the wall, the pipe swells locally and covers completely the protrusions and the convex surface of the emitter.

The final phase both of the swelling and of the welding of the emitter and its protrusions is being done at the place of their contact with the system of the two elastic wheels. The tread of the elastic wheels bear several geometrical shapes and engravings and compress steadily and radially the walls of the pipe, while at the same time the narrow inner contact's zone between the wheels, which is rather elastic due to its shape and its material composition, presses also almost vertically the inclined sides of the protrusions, ensuring a uniform without gaps welding on the entire convex surface especially at the inaccessible places of the central longitudinal zone just before and after the protrusions.

The water outlets are created by the cutting-off of the tips of the protrusions and the nozzles along with the part of the pipe covering them. The cutting-off of the tips takes place while the pipe passes through a continuously rotating fraise located at the end of the production line. The height of the cut is adjustable, to ensure the necessary and sufficient height of the nozzle over the outer surface of the pipe.

The cutting-off of the tips for pipes with cylindrical emitters or linear hybrid emitters that due to their thick walls are incapable or not allowed to be flattened is being performed by fraise or fraises that bear preferably cutting teeth/blades almost radially arranged with circular and conical cutting profile that ensures exactly the same cutting behavior on all the points of the contact surface of the cutting edge of the blade. Maintaining of the cylindrical form of the pipe during cutting-off is ensured by arrays of concave and cylindrical rollers arranged forward, behind and under the cutting place. These rollers as well as the cutting fraises may be arranged peripherally every 120° covering the entire cylindrical surface.

DESCRIPTION OF DRAWINGS

FIG. 6 illustrates the plan view of a linear hybrid emitter with two distant water outlet openings, one on each end of it.

FIG. 7 illustrates the plan view of a linear self-compensated hybrid emitter.

FIG. 8 illustrates the cross-section C-C of the hybrid emitter of FIG. 7 with part of the attached pipe.

FIG. 13 illustrates a typical emitter of the state of the art with local protrusion suitable for attachment into the pipe.

FIG. 19 illustrates a detail of the compression for welding of an emitter with a local protrusion, at a place away and after the local protrusion, where the convex surface of the emitter is smooth.

DETAILED DESCRIPTION OF THE INVENTION

Figure 1:
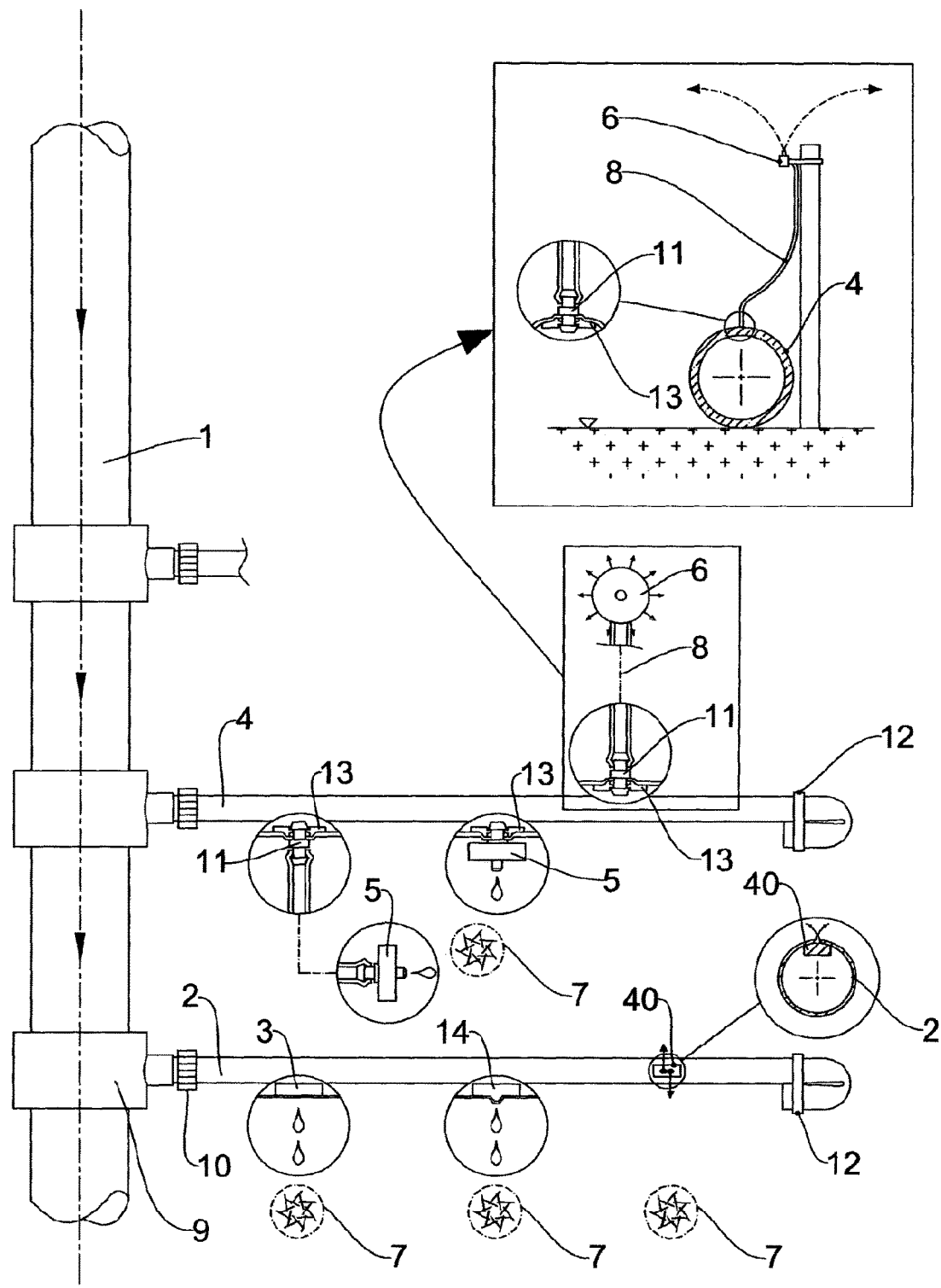
FIG. 1 illustrates an arrangement of an irrigation installation with main and lateral pipes and hybrid emitters, known emitters, micro-sprinklers, micro-base, micro-connectors, etc.

FIG. 1, illustrates an irrigation installation with: main pipe 1, dripline pipes 2, lateral pipes 4, hybrid emitters, emitters of internally welded (in-line) linear type in general (14, 40) 3, emitters of on-line type 5, in-line welded mini-bases for couplings, adaptors, etc. 13, micro-connectors (nipples) 11, micro-tubes 8, micro-sprinklers 6, saddles 9, couplings 10, end plugs 12.

In-line emitters could be: a) linear (flat) with smooth convex surface 3, or b) linear (flat) with local protrusions 14, both of which of the state of the art, as well as: c) linear (flat) hybrid emitters 40, 40a, 40b, 40c, or cylindrical hybrid emitters 66 with local protrusions 45 and 70 respectively, of the present invention.

The dripline pipes 2 and the lateral pipes 4 are applied along the row of trees and plants 7. The lateral pipes 4 bear incorporated mini-bases of couplings 13 and the on-line emitters 5, or feed the micro-sprinklers 8. The connection of on-line emitters 5 is performed externally, either directly by means of incorporated mini-bases 13 of the lateral pipes 4, or indirectly through micro-connectors (nipples) 11 and micro-tubes 8 that are connected also on the incorporated mini-bases for couplings 13.

Figure 2:
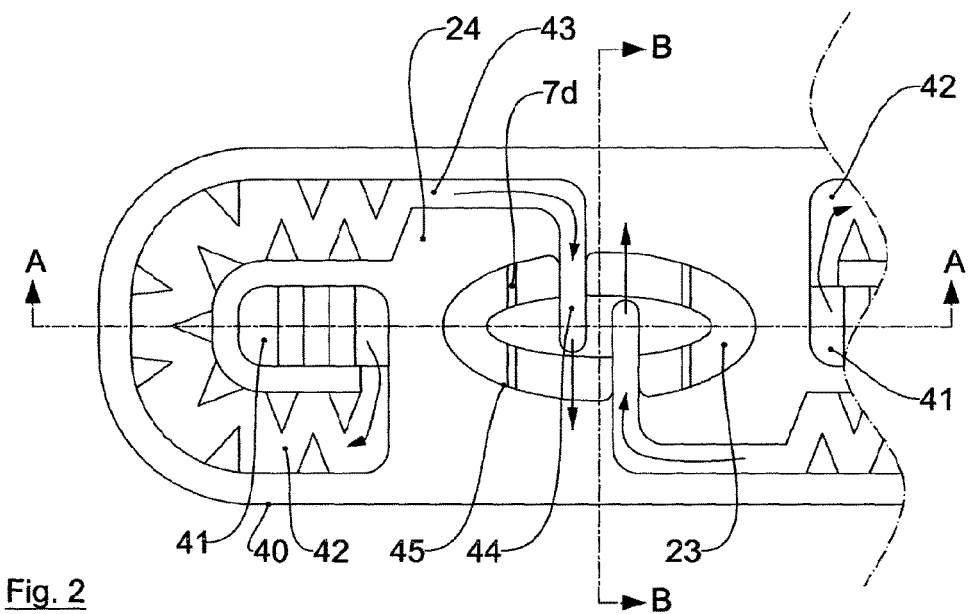
FIG. 2 illustrates the plan view of a linear non pressure compensated hybrid emitter with two independent paths and two nozzles at the middle of the emitter.
Figure 3:
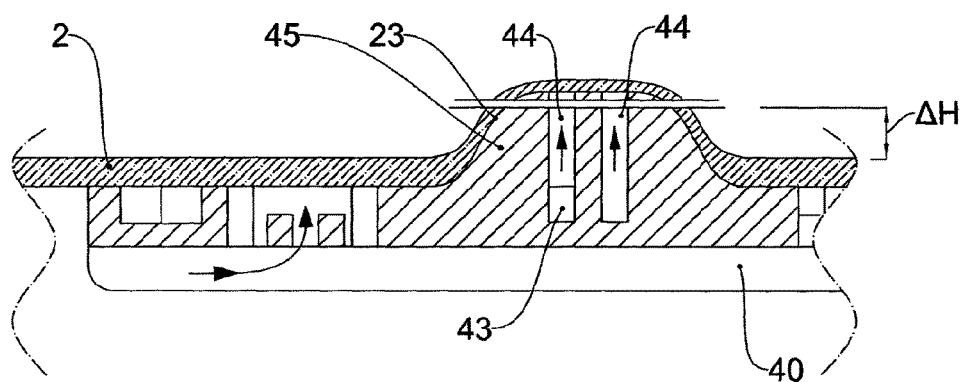
FIG. 3 illustrates the cross-section A-A of the hybrid emitter of FIG. 2 with a part of the attached pipe.

FIG. 2,3,4 illustrate the plan view of the cross-section A-A and B-B respectively of a linear non-pressure compensated hybrid emitter 40 of preferably low discharge rate suitable for welding internally of a lateral feeding pipe 2. In the center and directly over the external cylindrical surface 24 of the hybrid emitter 40 are emerged characteristic protrusions 45 of considerable height. The hybrid emitter 40 is double, featuring double water inlet filters 41, two independent meandering paths 42, as well as two exit channels 43 that comprise the continuation of the meandering paths 43. The channels 43 connect the meandering paths with the two outlet nozzles 44 of the water that are formed in the interior of the protrusions 45. The protrusions 45 are emerged directly over the external cylindrical convex surface of the hybrid emitter bearing slightly inclined side walls 23.

The water supply of the nozzles 44 from the exit channels 43 is done preferably vertically to the longitudinal axis of the pipe and the emitter. The outlet openings are created by the cutting-off of the tips of the protrusions 45 that continue to considerably protrude even after the cutting-off of the tips.

In the known, from drip irrigation, meandering path dominates turbulent flow, enabling the effective pressure drop (pressure elimination) causing the drastic limitation of the water exit velocity and therefore the limitation of the water discharge.

At the present invention which regards hybrid emitters of low discharge, similar to the discharge of the known drip irrigation, there are specific differentiations, such as: a) the total length and b) the cross-section of the new meandering path is calculated and designed such a way, in order not to be eliminated the total available grid pressure and the water to exit in the form of drops (similar to drip irrigation), but allowing for a part of the hydraulic pressure always to be available and adequate of ejecting water with suitable velocity in the form of fine jet and of specific and stable parabolic trajectory at a small and specific distance (range) 3-30 cm, without touching-leaking the pipe walls.

The optimal range is varied and is designed separate for every case according to the: composition of the soil, the application, and the required wetted soil surface or volume. The stable trajectory and the continuous shape of flow is supported by the fact that the flow after the meandering path 42 is totally converted from turbulent to laminar within the considerable length of the narrow exit channel 43 and the form of the nozzles 44 that follow. It is important the fact, that the protrusions 45 along with the nozzles 44 continue to protrude considerably by ΔH over the pipe's surface and after the cutting-off of their tips, in order to create the water outlet openings. The cutting-off is performed along with the part of the pipe that convers them.

It should be noted that a certain length of exit channel 43 after the meandering path is required in order for the laminar flow to be completely developed. The "entrance length" Le, i.e. the total length of the exit channel 43 after the meandering path where the laminar flow acquires 99% of its full profile, has to be equal to (8-20)*d. The relation holds: Le=(8-20)*d. Where d is the equivalent diameter of the cross-section, and Le the sum of the length of the exit channel 43 plus the length of the nozzle 44. These prerequisites are guaranteed at the present invention since the meandering paths are shorter in comparison to the corresponding ones of the emitters of the state of the art, and thus there is sufficient available length left and right of the protrusions in order to the water exit channels 43 to be developed. In some cases this sufficient length could not be a mandatory prerequisite, since there are meandering paths where the flow is not totally turbulent, the pressure is not completely throttled and eliminated and therefore the flow jet could be in the adequate jet form even with smaller length of exit channel 43. The exit channels 43 have preferably the same or narrower cross-section in comparison to the meandering paths 42, while the nozzles 44 that follow have preferably converging shape in order to supplementary increase the velocity, if needed. This is happening in case where the exit channels 43, for protection reasons against clogging and mainly for direct conversion to the laminar flow, are designed more spacious than they should have been, and as a result the velocity drops and is not high enough.

The water is ejected from the two cross-wise arranged nozzles 44 with two discrete and diverging jets to parabolic trajectories that move preferably on two parallel levels vertical to the longitudinal axis of the pipe. The trajectories start from two symmetrical angles +α° and −α° left and right of the axis of symmetry Y, or of the projection of the radius of the cross-section of the pipe that pass through the two points of the water outlet.

The limitation of the phenomenon of the dispersion of the water in very fine particles due to the resistance of the air (the main issue by all the known micro-sprinklers), is the main characteristic and feature of the present invention. For this reason the water ejection is performed with only one jet for every nozzle, at a minimum height and a small distance from the soil in order for the jet on one hand not to be disturbed and on the other the water moving into the soil to follow the expected laws of drip irrigation. A characteristic of the present invention is: a) the assurance of the required range of the trajectory, b) the preservation of the consistency of the water to its trajectory towards the soil (avoiding the phenomenon of the dispersion), and c) the maintenance of the character of low water discharge of the drip irrigation.

For this reason it is sought the optimum combination of the parameters mentioned below: a) the magnitude (%) of the pressure drop of the available grid's pressure in the meandering path 41, b) the length and the cross-section of the exit channel 43, c) the geometry, the progressive reduction of the cross-section (convergent) and the length (or height ΔH) of the raised part of the nozzle 44, and d) the final cross-section of the tip of the nozzle after the cutting-off.

In comparison to the corresponding drip irrigation emitter of the same nominal discharge and of the same available grid pressure, the new hybrid emitter 40, will have certainly shorter total length of meandering parts and thus shall require a shorter surface and size of the emitter, but most certainly a more spacious cross-section of meandering path 42 for the protection against clogging. The above, as a consequence of the fact that intensive pressure drop is not required.

In the present invention, in case of an unforeseen event that one of the two jets is launched vertically, and to its downward trajectory/motion it happens to fall again over the pipe's surface, its fall shall have considerable both velocity and kinetic energy and due to its solid jet the most of the water amount shall not remain on the pipe's surface but rather vertically continue towards the soil without any leaking on the pipe surface. It is obvious that the second jet shall follow an almost horizontally trajectory over the soil, where even on this unforeseen case the result is not far from the targeted and expected.

In cases of high grid pressure, and in order to avoid uncontrollable range of the trajectories, a pressure regulator 75 (FIG. 12) is installed at the begging of the lateral pipe.

Figure 4:
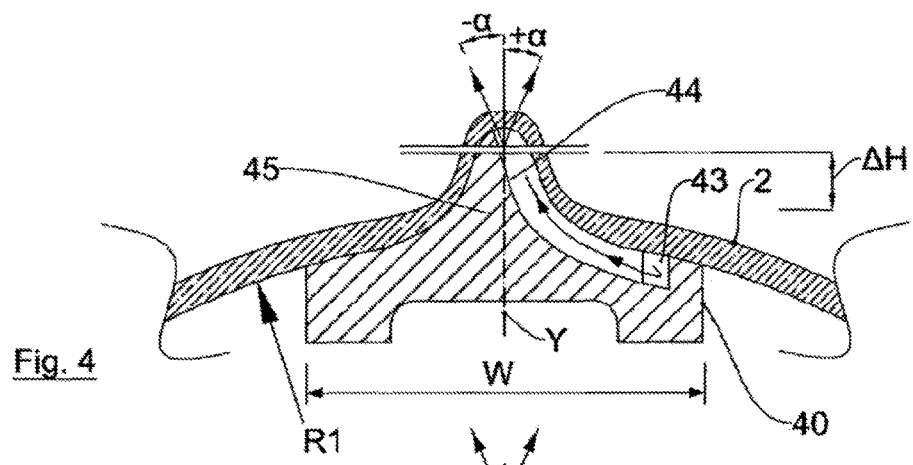
FIG. 4 illustrates the cross-section B-B of the hybrid emitter of FIG. 2 with part of the attached pipe.
Figure 4A:
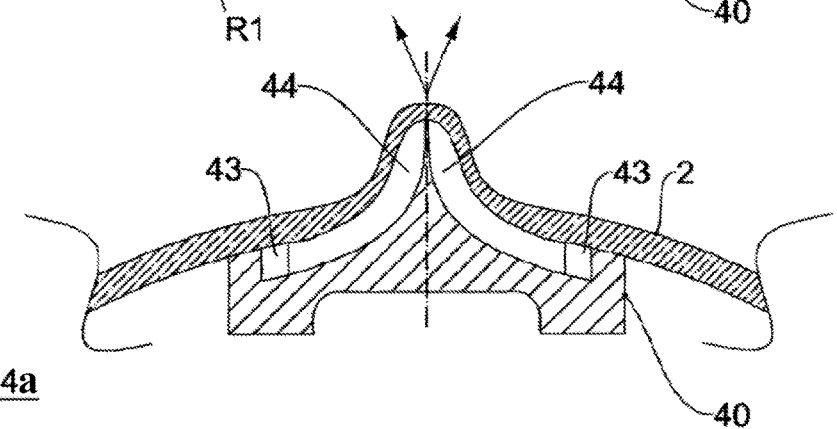
FIG. 4a illustrates a hybrid emitter with the nozzles located at the same vertical level.

FIG. 4a illustrates the hybrid emitter with the nozzles 44 to be located at the same vertical level.

Figure 5:
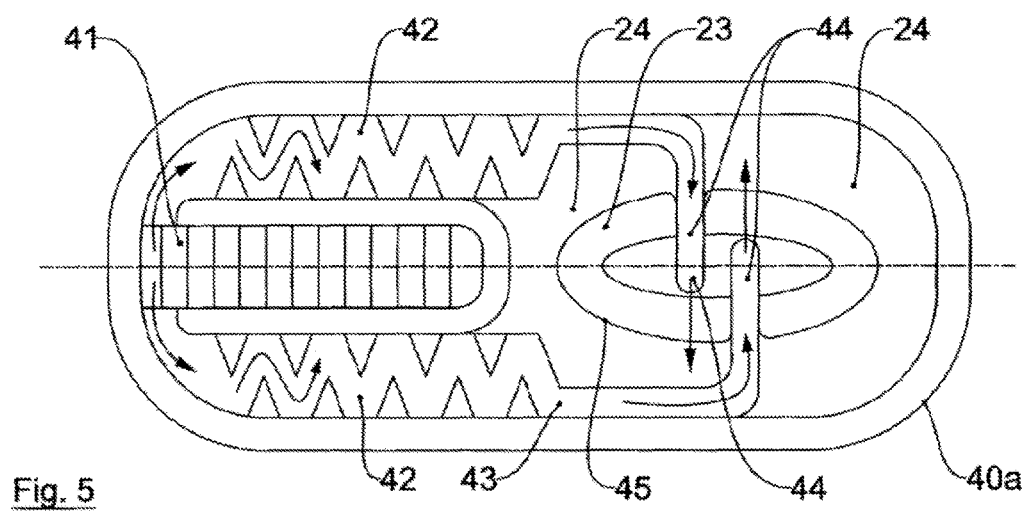
FIG. 5 illustrates the plan view of a linear asymmetrical hybrid emitter with two outlet openings on one end and two independent meandering paths.

FIG. 5 illustrates the plan view of a linear non-pressure compensated asymmetrical hybrid emitter 40a with two water outlet openings 44 and two independent meandering paths 42. The hybrid emitter is deemed asymmetrical, since the protrusion 45, is located at its one end.

FIG. 6 illustrates the plan view of a linear hybrid emitter 40b with two completely independent and distant water outlet openings 44, one at each of its ends, guaranteeing even further the decentralized location and the more effective soil surface wetting.

The same variations could be used also for the pressure compensated hybrid emitters:

FIG. 7,8 illustrates the plan view and the cross-section C-C respectively of a linear pressure compensated hybrid emitter 40c, with the protrusions 45 and the two nozzles 44 formed internally to the protrusions 45. The hybrid emitter 40c is complex and consists in general from three parts: the base 47, the cover part 48 and the elastic membrane 49. The hybrid emitter through the membrane 49 and the meandering path (is located in the interior of the hybrid emitter 40c and is not illustrated in the specific designs) maintains a constant discharge for a large range of water grid pressures. The principle of operation is known to the drip irrigation. The water from the meandering path and the pressure compensation chamber 50 feeds the two exit channels 50 through the communication opening 51. The new membrane system 49 and the new meandering path of the present invention is distinguishing from the drip irrigation since it maintains a specific pressure and therefore a water outlet velocity, adequate to develop two diverging parabolic trajectories, similar as described at the non-pressure compensated hybrid emitters 40, 40a, 40b. Otherwise the hybrid emitter 40c keeps all the main characteristic features of the previous ones, as such the complete covering of the protrusions 45 that are based directly onto the convex surface 24, along with the covering from the pipe 2 and the process of the creating of the outlet openings onto the pipe by the cutting-off of the tips of the nozzles 44.

Figures 9, 10:
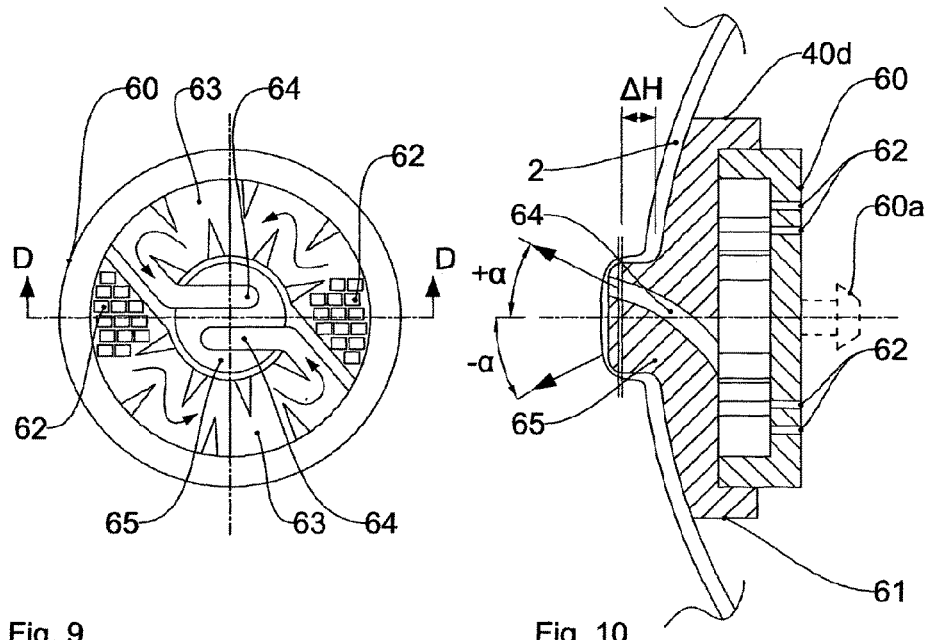
FIG. 9 illustrates the plan view of a hybrid emitter of on-line type suitable for attachment into the pipe, without its cover part.
FIG. 10 illustrates the cross-section D-D of the hybrid emitter of FIG. 9 with part of the attached pipe.

FIG. 9 illustrates the plan view of the base 60 of the hybrid emitter 40d of on-line type but suitably formed for attachment in the interior of the pipe, while FIG. 10 illustrates the cross-section D-D of the hybrid emitter 40d along with the cover part 61 and the part of the attached pipe 2. There are two filters 62, two meandering paths 63, and two outlet openings 64 with angles $+\alpha°$ and $-\alpha°$, left and right respectively, through the protrusion 65. At another variation the hybrid emitter 40d could bear the known support and water supply nozzle 60a (dashed lines on the design) in order not to be welded inside, but fixed onto the pipe even as an on-line hybrid emitter.

Figure 11:
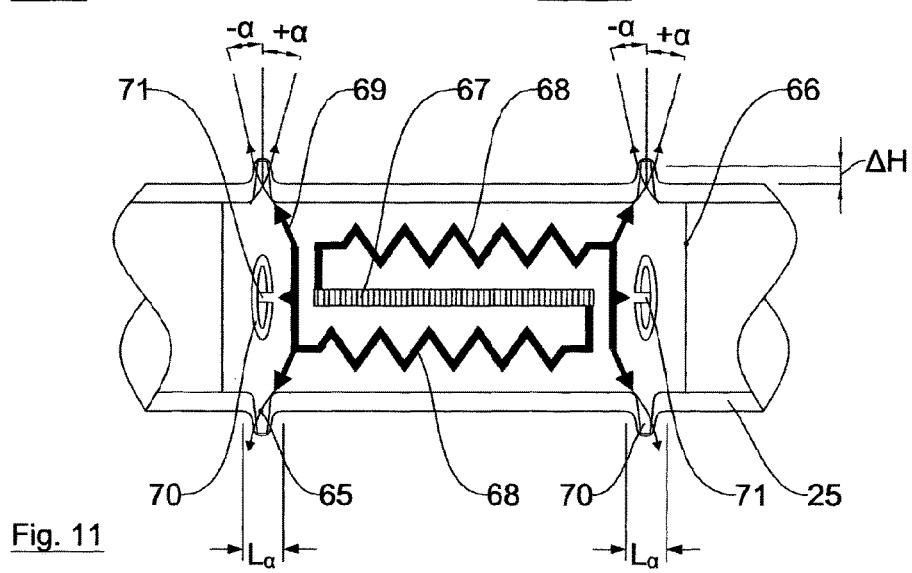
FIG. 11 illustrates schematically a variation where the hybrid emitter is cylindrical.

FIG. 11 illustrates schematically another variation where the hybrid emitter 66 is cylindrical. In this case the hybrid emitter bears the filters 67, the meandering paths 68, the exit channels 69, the protrusions 70, and the nozzles 71 at angles $+\alpha°$ and $-\alpha°$, similarly to the previously mentioned variations. The differences are that the protrusions 70: a) are developed preferably peripherally on both ends of length La of the hybrid emitter, and b) there are might be more than two, uniformly arranged on the same periphery.

The cylindrical hybrid emitter 66 could be also pressure compensated. At this case, as well as in the case of the respective linear hybrid emitter 40c (FIG. 7,8) the discharge and the water final outlet velocity is controlled continuously and automatically by a modified meandering path, a modified elastic membrane and a compensation chamber, similar to the above mentioned 40c. As far as the respective exit channels 53 and the corresponding communication opening 51 are concerned, are both similar to FIG. 7,8. As far as the protrusions are concerned with the associated nozzles, they are similar with the protrusions 70 and the nozzles 71 of the corresponding simple cylindrical hybrid emitter 66.

The nozzles 71 are created by the cutting-off of the tips of the protrusions 70 along with the attached part of the pipe 25 that covers them, but remains a very important part of the height ΔH, that remain protruding beyond the surface of the pipe.

It is obvious that the discharge of the hybrid emitter 40 could be considerably higher in relation to the corresponding low discharge of the drip irrigation emitters and to approach those of the micro-sprinklers in order to the water to be ejected with steady and discrete trajectories to greater ranges.

In another variation the hybrid emitter could bear a third nozzle 44v between the two inclined nozzles 44 with the difference that this one would be vertical over the convex surface of the hybrid emitter 40 and the pipe, ejecting vertically the water between the other two. (Not drawn).

In another variation there could be one and only outlet with a single nozzle vertical to the hybrid emitter and the pipe. (Not drawn).

In another variation instead of a single couple of nozzles there could be plenty more. At this case the discharge of the hybrid emitter would be significantly higher in comparison to the corresponding low discharge of the known drip irrigation emitter. (Not drawn)

At another variation there could be a common meandering path 42 with two exit channels 43 that would feed the outlet nozzles 44. (Not drawn).

It is obvious that there could be developed with combinations more variations.

Figure 12:
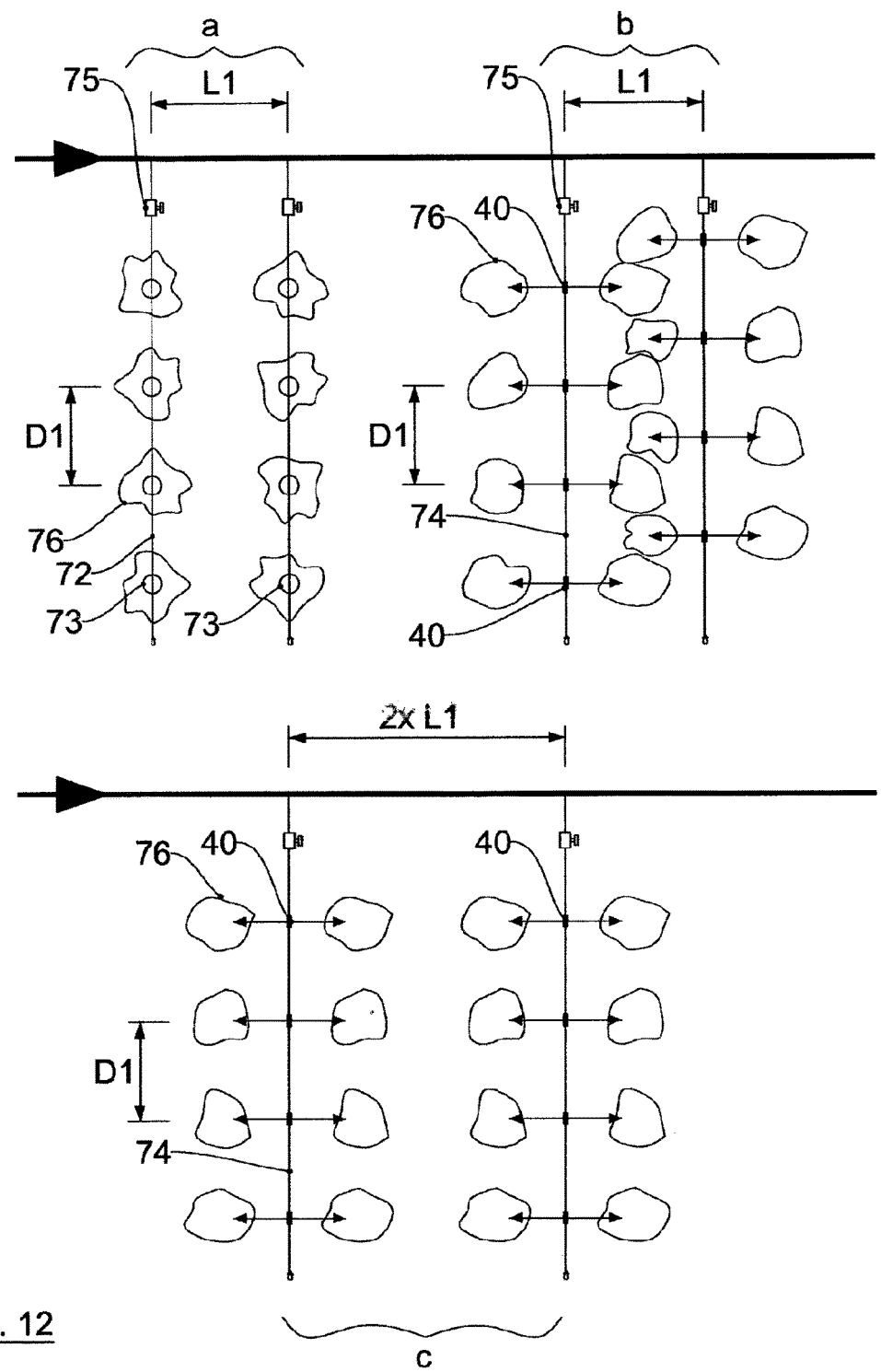
FIG. 12 illustrates for comparison means the arrangement of an installation at a field with dripline pipe systems of the state of the art, along with corresponding arrangements of pipes and hybrid emitters of the present invention.

FIG. 12 illustrates for comparison reasons three application's arrangements: a) an application of dripline pipes 72 and drip irrigation emitters 73 of the general state of the art, and b) and c) two more applications of lateral pipes 74 both with hybrid emitters 40 of the present invention. The three arrangements are developed to three consecutive zones-lanes of cultivated fields of surfaces (a), (b), and (c) respectively. The distances ($D_1$) between the drip irrigation emitters 73 as well as between the hybrid emitters 40, are the same for all the arrangements a), b) and c). For comparison purposes, the distances $L_1$ are also the same, between the driplines 72 of the state of the art (case a), as well as between the laterals 74 of the new hybrid emitters 40 (cases b). But at the zone (c) the distances between the laterals 74 are doubled: $2\times L_1$. We also assume for simplification purposes that the range of the hybrid emitters 40 is equal to the $L_1/3$ (or 0.33 $L_1$).

At the begging of all dripline pipes there are pressure regulators 75 for the control and limitation of the grid pressure at predefined limits.

The footprint of the wetted area 76 of the soil displays an almost equal circular surface, and the total wetted surface is exactly the same for all cases since the discharge of the hybrid emitters 40 is chosen to be double compared to the discharge of the drip irrigation emitters 73, in order for the drip irrigation emitters 73 and every one of the two trajectories of the hybrid emitters to have the same discharge.

The difference between the state of the art and the present invention regards the percentage of wetted surface of the soil for the same number of rows both of the classic driplines 72 and the laterals 74 with the hybrid emitters 40. We can observe that for the same conditions, the total wetted surface is double in the case of the present invention as it is obvious from the comparison of the zones (a) and (b). It is certain that wetting is more decentralized and presents a greater dispersion of the total wetted points-areas 76 (doubled) and better allocation, a very important advantage for drip irrigation.

From the comparison between the zones (a) and (c), it is also obvious that the number of irrigation rows-laterals of the present invention could, for the same surface coverage and dispersion, be reduced almost to half. Given that the cost of the driplines and the pipelines in general constitutes about the 80% of the total cost of an irrigation installation, the total cost of the installation could be drastically reduced.

Regarding the Method of Welding and Integration.

FIG. 13 illustrates a typical known emitter 14 (or even a hybrid emitter 40 of the present invention) with the local protrusions 18 (or 45 of the hybrid emitter 40), the meandering path that are developed left and right, and the central longitudinal zone of width M which includes the protrusions. This particular zone M apart from the protrusions, includes the zones A and B with the transversally arranged connection parts of the meandering paths 41b. It is clear that for proper function of the emitters (or the hybrid ones) a uniform compression throughout the entire convex surface 24 (without exceptions and with the central zone and the protrusions included) and a sealed welding is required.

FIG. 14 illustrates an arrangement of the insertion and incorporation of an accessory into the pipe. The accessory at this particular case is an in-line linear emitter 14 or a hybrid one 40 of FIG. 13, that bears local protrusions 18,45 on its convex surface 24, that is being inserted in the vacuum bath 15, or its pre-chamber where generally higher temperatures and moderate negative pressures prevail in comparison to the main bath.

The pipe 2 is extruded from a cross-head (not drawn) and is inserted to the bath 15 and comes to contact with the cooling water and the fix calibrator 16. All the emitters 14, or the hybrid ones 40, with their protrusions 18, 45, are inserted into the pipe 2 being arranged in an array with the same orientation and preferably in contact to each other. A couple of endless feeding bands (caterpillar) outside the cross-head (not drawn) is pushing the emitters (or the hybrid ones 40) through an opening of the fix internal guide 19 in the interior of the fix calibrator 16 with a specific velocity $V_1$ until they meet the extruded pipe 2 of velocity V.

Almost at the end of the fix calibrator 16, in contact and under the passing through pipe 2, an arrangement of elastic wheels 20 is installed.

The wheels 20 are two independent elastic ones with rotational axis that draw between them an angle of $\alpha°$ preferably 45°-90°, and are driven by a special motor, or motors with constant peripheral velocity V, equal to the respective velocity of the extruded pipe 2.

The emitter 14, or the hybrid one 40 is attached initially by its proceeded tip $14_1$ and by the protrusion 18, 45 and is welded slightly into the pipe 2 where the following phases take place:

The emitter 14 is carried over by the pipe, is accelerated reaching the velocity V of the pipe 2, while the emitter is rotated on the inclined level 19a at an angle $\beta°$ around its proceeded tip $14_1$, is dragged by the wheels 20, and is compressed between the wheels and the horizontal level 26, that is developed after the inclined level 19a of the fix internal guide 19. It is then leveled horizontally onto the level 26, its protrusion 18, 45 submerges in the walls of the pipe 2 swelling it, while the simultaneous compression exerted between the wheels 20 and the horizontal level 26 of the guide is attaching tightly and reliably the emitter and its protrusions at the walls of the pipe.

In another variation the insertion of emitters and their initial attachment into the passing through pipe 2 could be performed well before the vacuum baths 15, i.e. already inside the cross-head of the extruder where the temperature is higher. The final compression could take place later on within the bath by the wheels. Not drawn.

Figure 15:
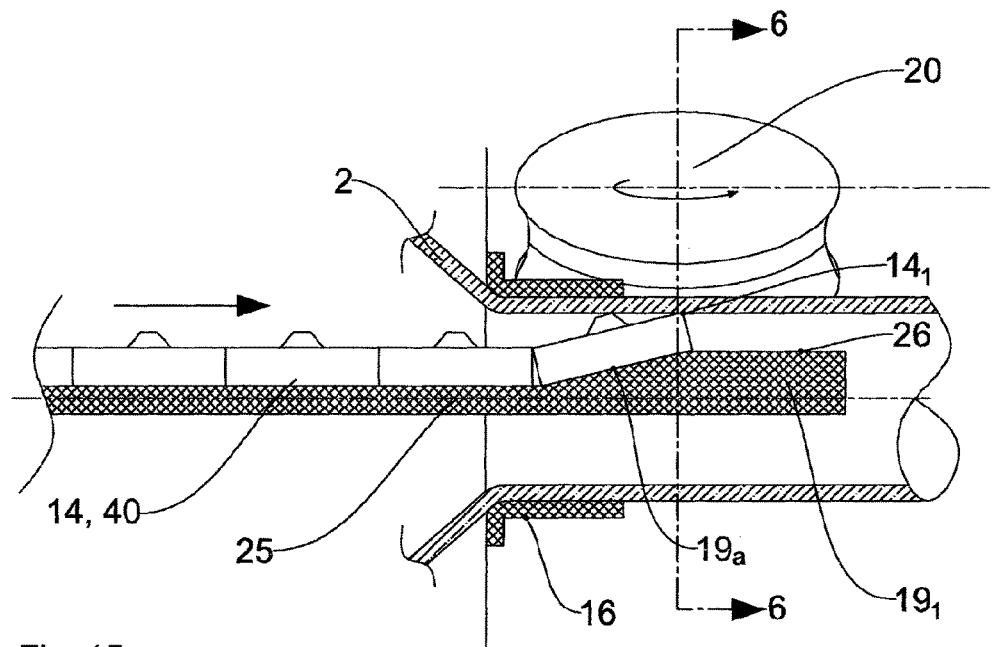
FIG. 15 illustrates a variation of the arrangement for the incorporation of accessories (emitter, mini-base, etc.) into the pipe with the elastic wheels positioned over the pipe.

FIG. 15 illustrates another variation where the emitters 14, or the hybrid ones 40 are inserted in the area of the internal guide $19_1$ which is inverted on this particular variation. The guide $19_1$ similarly to the corresponding design 19, develops in succession three levels: a horizontal one 25, an inclined $19_a$ and a second horizontal elevated level 26 at its end.

Both wheels 20 are placed and rotate over the pipe 2. The emitter 14, or the hybrid one 40, are forwarded preferably in contact to each other in an array and take over the entire horizontal level 25 of the fix internal guide $19_1$ up to the inclined level $19_a$. Immediately when the first emitter comes in contact with the hot passing through pipe 2 is separated from the others, pivoting at an angle $\beta°$ around its preceding tip $14_1$ and attaches itself as already known internally to the pipe being compressed between the wheels 20 and the second horizontal level 26 of the fix internal guide $19_1$.

Figure 16:
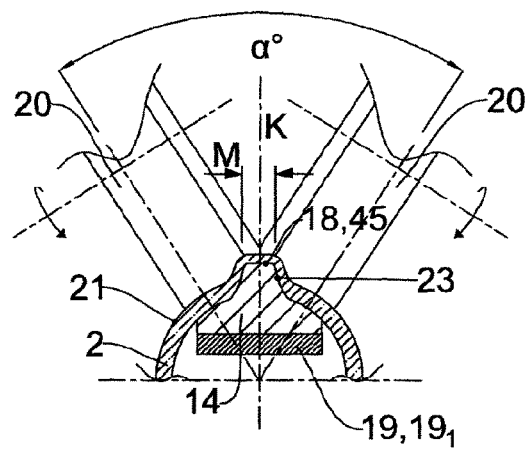
FIG. 16 illustrates the cross-section 6-6 of the arrangement of FIG. 15.

FIG. 16 illustrates the cross-section 6-6 of FIG. 15.

Figure 17:
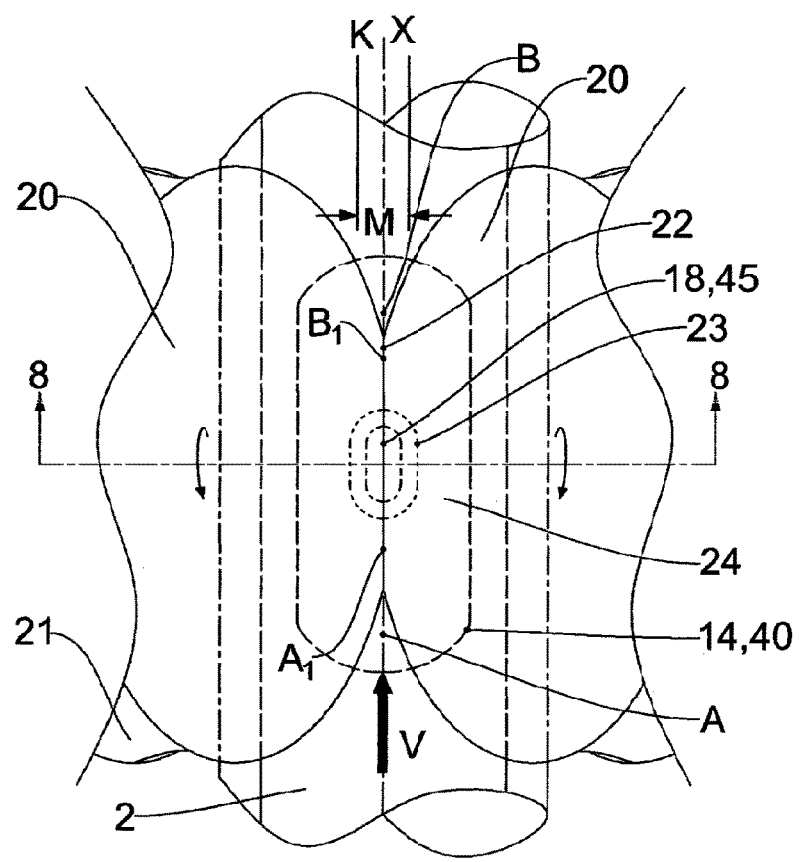
FIG. 17 illustrates the plan view of the elastic wheels of FIG. 15 with the passing through swollen pipe.

FIG. 17,18 illustrate a plan view and a cross-section 8-8 respectively of the elastic wheels' 20 system of the FIG. 15 with the pipe 2, the emitter 14, or the hybrid one 40, and the protrusion 18, 45 at the phase of compression. The profile of the main tread 21 of the elastic wheels 20 has lightly concave shape that matches the periphery of the pipe 2. The pressure p exerted from the main tread 21 of the wheels 20 on the pipe 2 is almost radial (vertical to the pipe surface) with the peripheral velocities of all the points of the profile of the treads 21, being equal, a fact that ensures the constant compression at the entire surface. Since the internal peripheral narrow zones/edges 22 of the main treads 21 of the wheels touch each other over the surface of the pipe 2 and over the symmetry level K, are receding slightly at the areas of the protrusions embracing and pressing vertically the inclined sides 23 of the protrusions 18,45 ensuring a reliable welding even at the more difficult and inaccessible places such as the points $A_1$ and $B_1$ just before and after the protrusion 18,45, on the central zone M of the convex surface 24.

Figure 18:
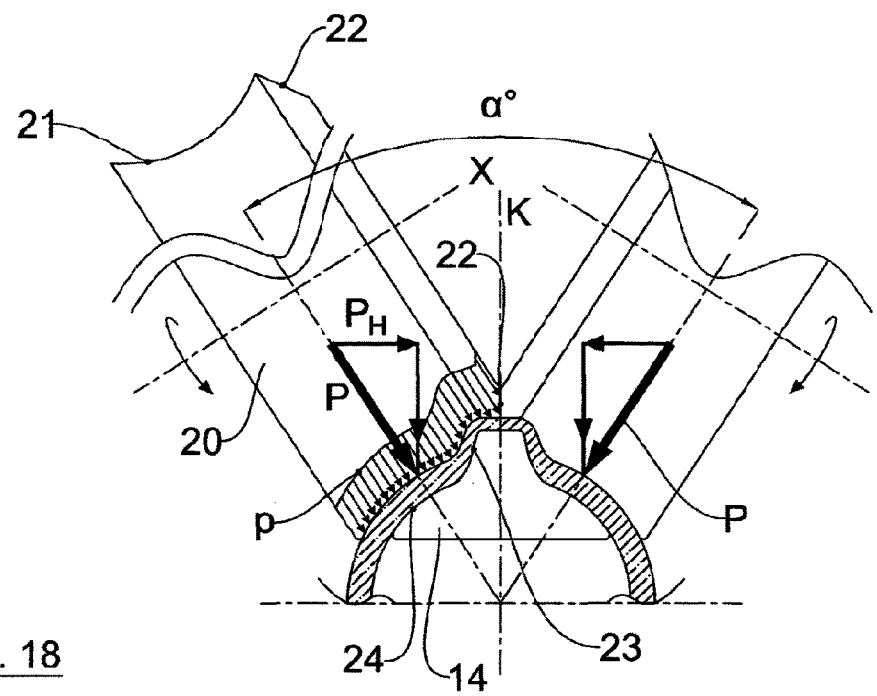
FIG. 18 illustrates the cross-section 8-8 of the elastic wheels with the passing through swollen pipe of FIG. 17.

In the FIG. 18 is shown the characteristic profile of the pressure development and distribution p both at the center 21 as well as in the internal peripheral zones 22 of the tread of the wheel that are in contact to each other along the symmetry axis X and on the level K.

Due to the radial (vertical) pressure action on the convex surface 24 and simultaneously the almost vertical pressure on the inclined sides 23 of the protrusions 18,45, it is ensured that: a) gapless and completely tight welding of the meandering paths 35 that are engraved on the convex surface 24 of the emitter 14, or the hybrid one 40, b) the exertion of horizontal forces $P_H$ (components of the radial force P) from both sides over the protrusions 18,45 that exerts torques aligning continuously the emitter and the protrusions with the axis of symmetry X and with the vertical level K.

It is characteristic that the action of aligning forces $P_H$ initiates before the point of the contact between the two wheels, immediately when the protrusion 18,45 (in case it is not moving already on a straight line) presents the slightest deviation, and touches one of the two wheels first. This wheel will then exerts immediately the forces $P_H$ aligning and automatically directing the emitter and the protrusions towards the axis X and towards the vertical level K. This process will be continuously repeated.

Figure 19:
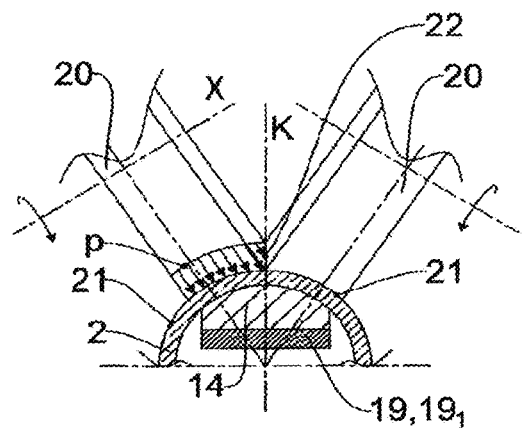
FIG. 19 illustrates an arrangement of incorporating an accessory (emitter, mini-base, etc.) into the pipe at its production phase with the elastic wheels positioned under the pipe.

FIG. 19 illustrates a detail showing one more crucial feature of the present invention, the uniform compression of the emitter even at the difficult and inaccessible area direct before and after the local protrusion 18,45 where the convex surface 24 is smooth. Meaning the areas $A_1$ & $B_1$ of the central zone M (FIG. 17).

Since the two peripheral frontal surfaces 22 are in contact, or are compressing each other at the vertical level K, the compression and welding of the convex surface 24 is not showing any irregularity, since the two wheels 20 are acting at this area as a "single wheel" of a slightly concave profile. But with the crucial difference (in comparison to the single one) that the two wheels are compressing at the same time radially (vertically on the surface) from right and left the convex surface 24, simultaneously aligning in a complementary way the emitter and the pipe with the axis X and the vertical level K, ensuring aligning, and uniform and perfect welding in addition.

It is characteristic that the entire irregular surface of the emitter is compressed vertically and uniformly even at the hardest to reach areas $A_1$, $B_1$ (FIG. 17), with the magnitude of compression (deformation) of the elastic material of the wheels to be minimal and uniform at all the points of the surfaces of the tread.

Figure 20:
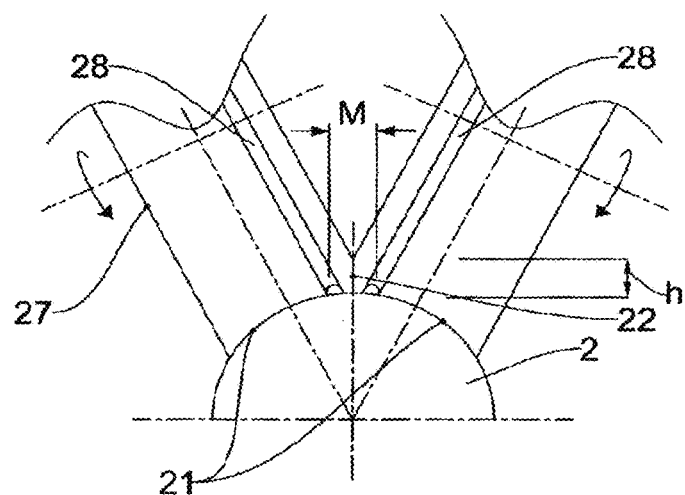
FIG. 20 illustrates a variation of the elastic wheels with the internal zones of the wheel's tread been separated from the main tread by a peripheral channel.

FIG. 20 illustrates a variation of the wheels 27 with the internal peripheral narrow zones 22 to be split from the main treads 21 by a peripheral channel 28.

Figure 21:
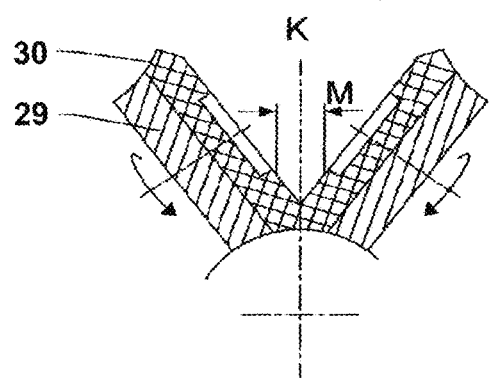
FIG. 21 illustrates an alternation of the elastic wheels with their internal peripheral narrow zones of tread bearing a concave and more elastic profile.

FIG. 21 illustrates a variation of the wheels 29 where the internal peripheral narrow zones 30 of the main treads 21 bear a concave and more elastic profile.

It is obvious that a large number of variations of geometric shapes and peripheral zones of the treads may occur, as well as the treads themselves. More over there might be shapes where the zone 22 bears radial grooves in order to locally increase the elasticity. Not drawn.

At another variation of the wheels the internal peripheral narrow zones/edges of the main treads 21 are made from different, more elastic material.

Figure 22:
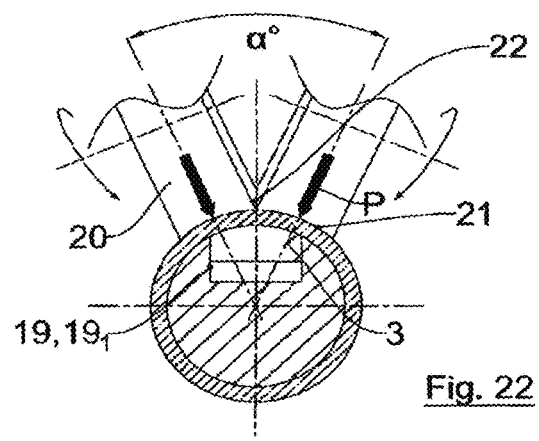
FIG. 22 illustrates a variation of the method of two wheels applied to the classic linear emitter of the state of the art with smooth convex surface at its entire.

FIG. 22 illustrates a variation of the wheels 20 of the present invention applied for the attachment of the simple classic known linear emitter 3 of the state of the art with smooth convex surface without any protruding parts. Besides the two wheels are behaving (similarly to already discussed in the FIG. 19) as a "single one" and much more advantageous in addition.

Figure 23:
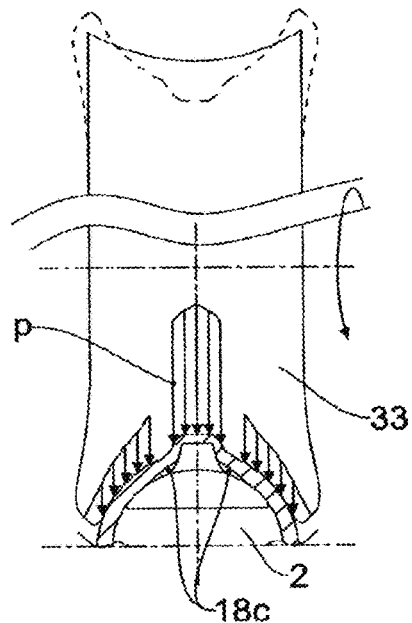
FIG. 23 illustrates a variation of the method of a simple wheel of the state of the art with smooth concave tread for the incorporation into the pipe of an emitter with protrusions.

FIG. 23 illustrates a variation of the application of a simple elastic wheel 33 of the state of the art bearing a simple concave tread by attachment into the pipe of a linear emitter 14, or a hybrid one 40, with protruding parts. In the design is shown the concave profile with the strong characteristic unequal distribution of the pressures p at the center and the peripheral zones of the surface of the wheel. The dashed line on the top part of the wheel illustrates the deformation of the tread and the gaps of welding created from the uneven exertion of pressure, while the full line shows for comparison the profile of the wheel uncompressed. It is obvious that the points: a) $18_c$ right and left from the bases of the protrusions and b) the places A & B and the points $A_1$ & $B_1$ just before and after the protrusions 18,45 and the entire central zone M as well (compared also FIG. 17) are not going to be compressed.

Figure 24:
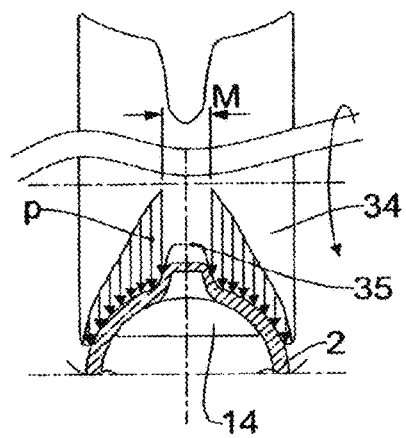
FIG. 24 illustrates a variation of the method of a wheel with peripheral channel of the state of the art for the incorporation into the pipe of an emitter with protrusions.

FIG. 24 illustrates a variation of the application of a different wheel 34 of the state of the art for the attachment into the pipe of a linear emitter 14, or hybrid one 40, with protruding parts. The wheel 34 bears at its center a deep peripheral channel 35. In the design is shown the characteristic profile with the strong unequal distribution of pressures p at the center and the peripheral zones of the surface of the wheel. It is obvious that the emitter 14 has to move perfectly aligned with the middle of the pipe and that the areas A and B of the zone M and especially the points $A_1$ & $B_1$ before and after the protrusions 18,45 (FIG. 17) will not be compressed.

Figure 25:
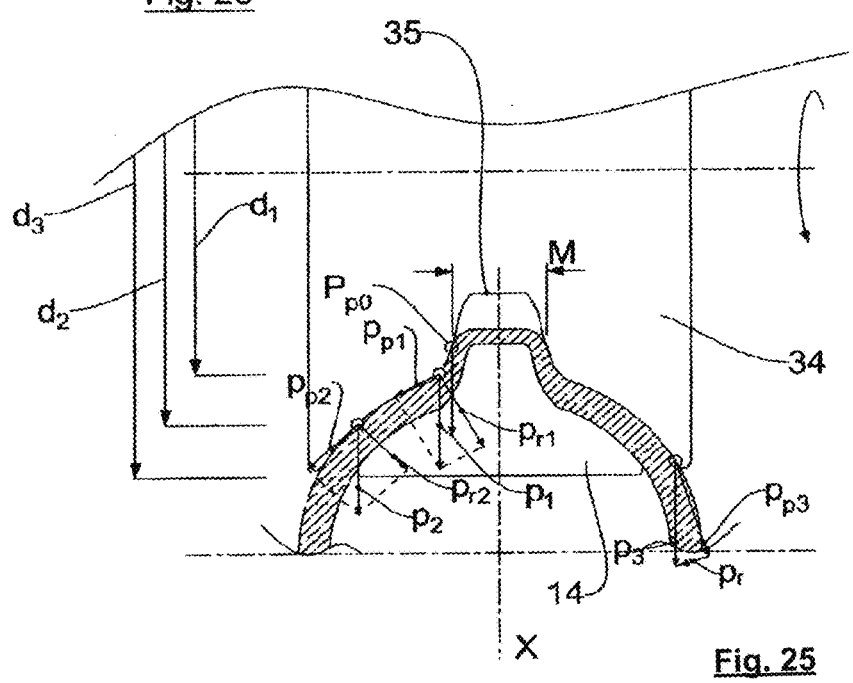
FIG. 25 illustrates a detail of the elastic wheel of FIG. 24 with the pressure forces, the peripheral velocities and the forces that are developed at the phase of compression.

FIG. 25 illustrates a detail of the profile of the pressure's development at the surface of the wheel 34 of FIG. 24. The pressures p that exert from the periphery of the elastic wheel over its contact area with the pipe 2, even though they have the same vertical direction, are neither the same (as shown in the profile at FIG. 23) nor exerting the same welding pressure on all the points. One component of the vertical pressure p, is radial $p_r$, compressing the pipe over the convex surface 24 of the emitter 14, or the hybrid one 40 causing a significant welding, while the other $p_p$, is of peripheral direction with tendency to cause displacement and distancing (slipping) of the walls from the convex surface 24 of the emitter, thinning locally the pipe, a fact that affects negative the welding, the uniformity of the wall thickness, tampers the characteristics and reduces the overall durability of the anyway extremely thin pipe. This distortion and tampering is proportional to the size of the peripheral arc occupied by the attached emitter as well as to the size, to the height and to the arc occupied by the local protrusions 18, 45. It is also obvious that the pressures and their components are different at the center and the periphery of the wheel 34. The following relation holds: $p_1 > p_2 > p_3$, and similarly $p_{r1} > p_{r2} > p_{r3}$, while also the reverse holds: $p_{p1} < p_{p2} < p_{p3}$. The pressure $p_{po}$ being exerted onto the inclined side surface of the protrusions has no peripheral component that could be able to align the emitter with the axis of the pipe. It is obvious also that the difference between the peripheral velocities of the different zones of the tread of the wheel 34 due to the huge difference on diameters $d_1$, $d_2$, $d_3$, affect negatively the uniform exertion of pressure onto the pipe and cause uncontrollable conditions and detachments at high production velocities and thin wall thickness pipes 2.

At another variation instead of two wheels 20, it could be installed a system of two endless elastic bands drawing an angle of almost 90° between them and are driven by one or two motors. The difference regarding the respective system of the two wheels is that the pressure acts simultaneously at a greater surface along the length of the emitter (Not drawn).

The same method can be used for the attachment of mini-bases 13 internally to the lateral pipes 4 utilized for the support of on-line emitters 5, micro-connectors (nipples) 11, etc. of FIG. 1. (WO 2012/12031712 A2).

The same method can be used for the welding emitters with protruding parts that are not being cutting-off at their tip for the creation of water outlet openings, but the openings are created between or around the protrusions by slicing the walls of the pipe at the production phase.

It is obvious that the incorporation system may be used successfully for non-linear emitters, of completely irregular and non-symmetrical form.

It is obvious that may be created new variations with the combination of the aforementioned, as well as the use of the method for the variations where the emitter being attached is of continuous shape (tape type). Not drawn.

Regarding the Method of Cutting-Off of the Tips.

A cutting device is added at the production line for the automatic cutting-off of the tips of the protruding parts and part of the pipe and the emitter, or the hybrid one, for the creation of the outlet openings.

Figure 26:
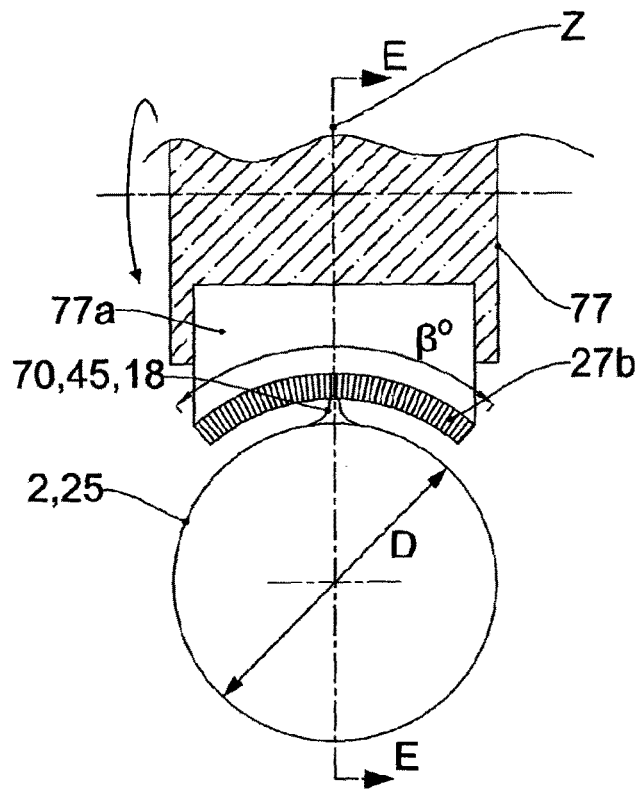
FIG. 26 illustrates the side view of a cutting fraise for cylindrical hybrid emitters or pipes that must remain cylindrical during the cutting-off.
Figure 27:
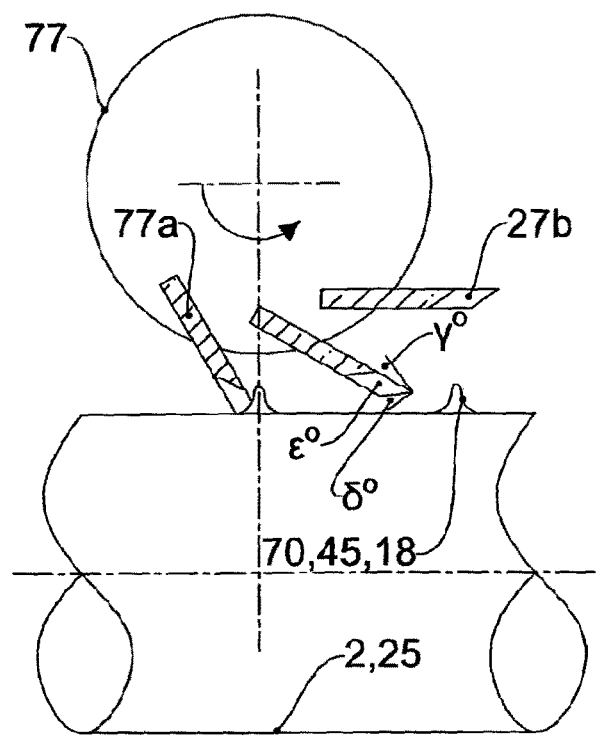
FIG. 27 illustrates the cross-section E-E of the cutting fraise of FIG. 26.
Figure 27A:
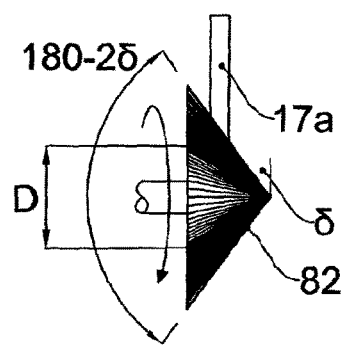
FIG. 27a illustrates the manufacturing process of the cutting blade by a cutting tool of conical shape.

FIG. 26,27 illustrate two side views of a cutting fraise 77 for protrusions of cylindrical emitters (or of cylindrical hybrid ones 66) and linear hybrid ones 14,40 and in general dripline pipes 2, or laterals 25 that due to their thick wall thickness are not allowed to be compressed and flattened at the phase of cutting-off of the tips. The fraise 77 bears teeth-blades 77a almost radially arranged with a circular cutting profile. The profile, which is conical at the same time, ensures the same exactly cutting behavior on all points of the periphery (the arc corresponding to the central angle β°) of the cutting profile 77b of the blade 77a. Meaning, that all the typical cutting blade angles, e.g.: rake angle γ°, clearance angle δ', wedge angle ε°, are the same for all the radial cross-sections of the cutting profile/blade. Therefore all the radial cross-sections E1-E1, E2-E2, E3-E3, etc. of the blade 77a, have the same profile with the cross-section E-E. This conical cutting profile may be created, if the cutting surface 77b is manufactured by a conical cutting tool 82 of conical angle 180°-2δ° as depicted at FIG. 27a.

Figure 28:
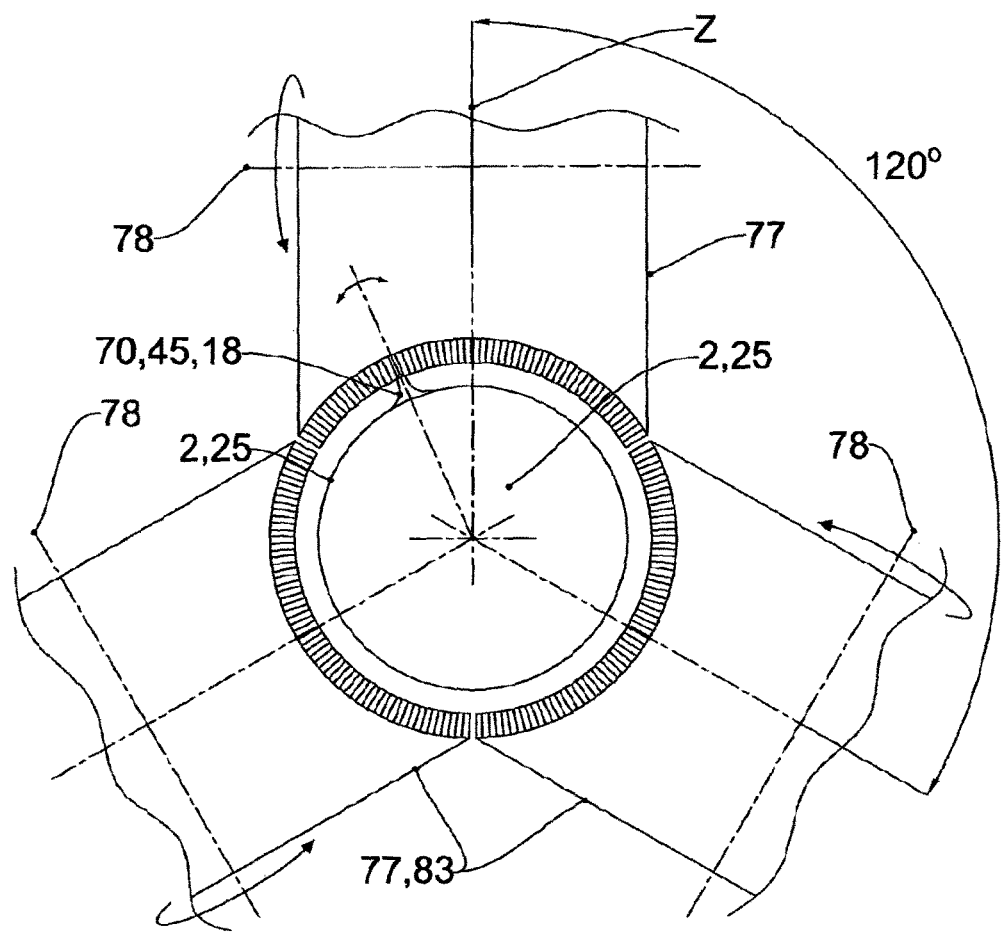
FIG. 28 illustrates an arrangement where both cutting fraises and rollers peripherally positioned every 120° for pipes that are not allowed to be compressed due to their thick wall thickness.

With this system are completely covered all the possible movements-rotations of the dripline pipes 2, and laterals 25 and the subsequent movements of the protrusions 77,45,18 left and right from the vertical axis Z (FIG. 28). Notice: the extruded pipe rotates and wobbles continuously slightly around its longitudinal axis, either way left or right, during its production phase.

It is obvious that fraises 77 could also be manufactured from solid metal with teeth instead of the attached blades 77a, similarly the cutting shape could be of simple concave form and not of a conical one, and without the ability of the same cutting behavior on the entire profile-arc of the cutting surface.

FIG. 28 illustrates an array of 3 cutting fraises 77. The fraises 77 are peripherally positioned in order to cover the entire periphery, since at cylindrical pipes it is not possible to maintain the protrusion 70,45 exactly on the vertical axis of symmetry Z when the emitter reaches the cutting station. The rotational axis 78 and 77, are not required to be located all at the same level, but there might be displaced in parallel along the length of the longitudinal axis of the pipe, keeping the angle of 120° between them.

In another variation there could be only one or only two cutting fraises. At this case the missing fraises are substituted by a set of equal amount of rollers 83 exactly at the same positions having the same geometry and same concave profile in order to maintain the completely cylindrical shape and the support during cutting.

The pipe before and after the cutting is moving and guiding in a straight line between an array of simple rollers, rotating freely: under, on the sides and over the pipe, providing direct support and correcting any imperfections of the circular cross-section of the pipe.

Similar arrangements with the peripheral arranged rollers at angles of 120° are present before and after the cutting place in order to maintain the circular shape of the pipe. Some of the rollers bear elastic coating treads in order to allow the passing through of the protrusions before the cutting, along with their remaining protruded parts (ΔH) after it.

What is claimed is:

1. A method for the welding and incorporation of emitters or mini-bases into a pipe during the production of the pipe, each emitter or mini-base covering only a part of the periphery of the pipe and having a protrusion emerging from a convex portion of the emitter or mini-base, such that the protrusions contact walls of the pipe, the method comprising:
    providing a vacuum bath or a pre-chamber with a calibrator opening at the beginning of the vacuum bath or pre-chamber, the calibrator opening having a predetermined cross-sectional size;
    providing a fixed internal guide which passes through a middle of the calibrator opening and extends horizontally, the guide comprising an elongated platform having two opposing surfaces, a first surface of the two opposing surfaces having a first flat section parallel to a central axis of the pipe, a second flat section parallel to the first flat section and being closer to a wall of the pipe that the first flat section, and an incline connecting the first flat section to the second flat section;
    providing, in the vacuum bath or in the pre-chamber and in a vicinity of the calibrator opening, two wheels arranged externally to the pipe and having respective rotation axes perpendicular to the central axis of the pipe, the rotation axes being oblique to each other, the wheels being driven to have a peripheral velocity V, each wheel having a respective main tread of a concave profile matching the curvature to of the pipe and a peripheral zone narrower than the main tread and located at an edge of the main tread, portions of the two wheels touching each other at the peripheral zones, the wheels being arranged symmetrically to each other with respect to a first plane perpendicular to the first and second flat sections of the fixed internal guide, the first plane containing the central axis of the pipe;
    extruding the pipe from a cross-head;
    inserting the pipe into the vacuum bath or pre-chamber;
    driving the pipe along the central axis of the pipe though the calibrator opening into the vacuum bath or the pre-chamber at the velocity V, thereby decreasing a cross-sectional surface of the pipe;
    placing the emitters or mini-bases on the first section of the guide, so that the protrusions face away from the first section of the guide;
    sliding the emitters or mini-bases along the guide, so that the emitters or mini-bases are compressed between the second section of the guide and the wall of the pipe and the protrusions are compressed against the wall of the pipe;
    guiding the emitters or the mini-bases and the pipe horizontally by rotating the two wheels, such that main treads are in continuous contact with an outer surface of the wall of the pipe, the wheels apply symmetrical pressures on the pipe at both sides of the first place, and the peripheral zones are recessed with respect to the main treads and embrace and press on inclined protruding portions of the pipe from two directions to keep the emitters or mini-bases aligned with the first plane.

2. The method of claim 1, wherein the wheels are placed under the pipe.

3. The method of claim 1, wherein the peripheral zones are separated from the respective main treads by a recessed channel.

4. The method of claim 1, wherein the peripheral zones are made of a material that is more elastic than a material of the main treads.

5. The method of claim 1, wherein the peripheral zones bear radial grooves.

6. The method of claim 1, wherein the wheels are driven by separate motor mechanisms.

7. The method of claim 1, wherein the emitters or mini-bases are non-linear or of an irregular and non-symmetrical form.

8. The method of claim 1, wherein the mini-bases comprise bases for support of on-line emitters or for micro-connectors.

9. The method of claim 1, wherein the wheels apply pressure to the pipe, the pressure being radial to the pipe's shape.

10. The method of claim 1, wherein an angle formed between the axes of the wheels is between 90 degrees and 135 degrees.

* * * * *